United States Patent [19]
Yanase et al.

[11] Patent Number: 6,060,983
[45] Date of Patent: May 9, 2000

[54] APPARATUS FOR ALARMING DECREASE IN TIRE AIR-PRESSURE AND METHOD THEREOF

[75] Inventors: Minao Yanase, Kobe; Hiroto Horie, Akashi, both of Japan

[73] Assignees: Sumitomo Rubber Industries, Ltd., Hyogo-ken; Sumitomo Electric Industries, Ltd., Osaka-fu, both of Japan

[21] Appl. No.: 09/166,965

[22] Filed: Oct. 6, 1998

[30] Foreign Application Priority Data

Oct. 6, 1997 [JP] Japan ................................ 9-273055
Jun. 10, 1998 [JP] Japan ................................ 10-161732

[51] Int. Cl.$^7$ ................................................ B60C 23/00
[52] U.S. Cl. ...................... 340/442; 340/444; 340/445; 73/146
[58] Field of Search ...................... 340/442, 444, 340/445, 443, 446, 447; 73/146, 146.2, 146.5

[56] References Cited

U.S. PATENT DOCUMENTS

| | | | |
|---|---|---|---|
| 5,578,984 | 11/1996 | Nakajima | 340/444 |
| 5,670,716 | 9/1997 | Tamasho et al. | 73/146.2 |
| 5,699,251 | 12/1997 | Mori et al. | 364/426.045 |
| 5,747,686 | 5/1998 | Nishihara et al. | 73/146.2 |
| 5,753,809 | 5/1998 | Ogusu et al. | 73/146.2 |
| 5,764,137 | 6/1998 | Zarkhin | 340/444 |
| 5,828,975 | 10/1998 | Isshiki et al. | 701/72 |
| 5,900,543 | 5/1999 | Oshiro | 73/146.2 |

FOREIGN PATENT DOCUMENTS 7-137512   5/1995   Japan .

*Primary Examiner*—Daniel J. Wu
*Assistant Examiner*—Toan Pham
*Attorney, Agent, or Firm*—Birch, Stewart, Kolasch & Birch, LLP

[57] ABSTRACT

An apparatus for alarming decrease in internal air-pressure of a tire based on rotational information obtained from tires attached to a four-wheeled vehicle. A relative speed ratio of driving wheels at the time of actual running is corrected based on a preliminarily relationship between the relative speed ratio of right and left tires of different types of driving wheels and driving force, and decrease in internal pressure of a tire is determined. The accuracy for determining decrease in internal pressure of a tire can be improved, and erroneous alarm or failure in alarm can be prevented.

19 Claims, 18 Drawing Sheets

APPARATUS FOR ALARMING DECREASE IN TIRE AIR-PRESSURE AND METHOD THEREOF

BACKGROUND OF THE INVENTION

The present invention relates to an apparatus for alarming a decrease in tire air-pressure and a method thereof. More particularly, it relates to an apparatus for alarming a decrease in tire air-pressure and a method thereof in which a decrease in internal pressure of an actually running tire can be reliably determined and an alarm can be generated accordingly based on rotational information of right and left tires of different types attached to a driving shaft, e.g. a new tire and a worn tire.

Determination of decompression based on a relative comparison of the number of revolutions of tires has conventionally been performed by storing ratios of the number of revolutions of each tire at the time of straight-ahead driving, corresponding to variations in the number of revolutions at the time of manufacturing tires and by correcting the measured numbers of revolutions of tires to determine decompression. However, while this method is based on a presupposition that the corrected values are not dependent on running speeds, relative speed differences that are dependent on speed are actually generated between driving wheels and following wheels owing to factors such as air resistance.

In other words, at the time of running at a high speed, driving force is acting on the driving wheels to overcome air resistance although the vehicle is running at a constant speed. The wheel speed difference between driving wheels and following wheels becomes larger than compared to the time at which the vehicle is running at a low speed.

However, while such changes are corrected by a function of speed in prior art methods, the whole theory is based on a presupposition that both tires of the driving wheels are of the same type.

For instance, in the case where right and left wheels at normal air pressure are of the same type (and their degrees of wear are also substantially identical), the relative speed ratio of the right and left tires with respect to the slip rate (driving force) of the tire is substantially constant, and the right and left wheel ratios of the following wheels and driving wheels are not affected by driving/braking as shown in FIGS. 15 and 16. Further, as shown in FIG. 17, in the case where a blowout of one of the tires of the following wheels has occurred with the degree of wear having progressed to some extent, and this is exchanged with a spare tire, the right and left wheel ratios of the following wheels will not be affected by the driving force. On the other hand, in the case where a blowout of one of the tires of the driving wheels has occurred and is exchanged with a spare tire so that the driving shaft bears tires of different degrees of wear, and the vehicle is running at a high speed, the driving wheels will of course be faster than the following wheels in terms of wheel speed, and the difference in degrees of wear between right and left driving wheels will further result in a right and left wheel ratio that is obviously sloped with respect to the slip rate as shown in FIG. 18, and a relative difference in wheel speed between right and left tires will be generated by the action of the driving force or braking force. Since such relative differences are not at all considered in prior art determining methods for decompression, they might affect determined values for decompression, resulting in erroneous alarm or in a failure to alarm. Thus, in the case where tires of different degrees of wear are attached to the driving shaft and the right and left wheel ratio is sloped with respect to the driving force, there exists a danger that erroneous alarm is released at the time of driving or braking although the air-pressure is normal.

On the other hand, a method is known in which relationships between front and rear wheel ratios and speeds are preliminarily stored and employed for correction at the time of actual running (refer to Japanese Unexamined Patent Publication No. 137512 /1995). However, this method is trying to correct front and rear wheel ratios at the time of actual running by preliminarily storing the phenomenon that the driving wheels rotate faster with an increase of the driving speed of the vehicle even at a constant driving speed, since driving force as to overcome the running resistance is required. Thus, if tires of driving wheels are intermediately exchanged, no correction of favorable accuracy can be performed.

The present invention has been made in view of these circumstances, and it is an object of the present invention to provide an apparatus for alarming a decrease in tire air-pressure and a method thereof with which erroneous alarm or failure to alarm can be prevented by correcting relative speed ratios that can be obtained from rotational information of right and left tires of different types of driving wheels or following wheels.

SUMMARY OF THE INVENTION

The apparatus for alarming decrease in tire air-pressure according to a first aspect of the present invention is an apparatus for alarming a decrease in internal air-pressure of a tire based on rotational information obtained from tires attached to a four-wheeled vehicle. A relative speed ratio of driving wheels at the time of actual running is corrected based on a preliminary relationship between the relative speed ratio of right and left tires of different types of driving wheels and driving force, and a decrease in internal pressure of a tire is determined.

The apparatus for alarming a decrease in tire air-pressure according to a second aspect of the present invention is an apparatus for alarming a decrease in internal air-pressure of a tire based on rotational information obtained from tires attached to a four-wheeled vehicle. The device includes a rotational information detecting means for detecting rotational information of each tire, a storing means for storing the rotational information of each tire and relationships between relative speed ratios of right and left tires of different types of driving wheels that have been preliminarily set to be of normal air-pressure and driving force, a calculating and processing means for calculating determined values from rotational information of each tire, and a determining means for correcting relative speed ratios of right and left tires of different types of driving wheels. These corrections are made at the time of actual running based on the relationship between the relative speed ratio of right and left tires of different types of driving wheels and driving force and for determining a decrease in internal pressure of a tire.

The method for alarming a decrease in tire air-pressure according to a third aspect of the present invention is a method for alarming a decrease in internal air-pressure of a tire based on rotational information obtained from tires attached to a four-wheeled vehicle. The method calculates a relative speed ratio of driving wheels at the time of actual running which is corrected based on a preliminarily stored relationship between the relative speed ratio of right and left tires of different types of driving wheels and driving force, and a decrease in internal pressure of a tire is determined.

The apparatus for alarming a decrease in tire air-pressure according to a fourth aspect of the present invention is an apparatus for alarming a decrease in internal air-pressure of a tire based on rotational information obtained from tires attached to a four-wheeled vehicle. A relative speed ratio of following wheels at the time of actual running is corrected based on a preliminarily stored relationship between the relative speed ratio of right and left tires of different types of following wheels, and a vehicle speed and decrease in internal pressure of a tire is determined.

The apparatus for alarming a decrease in tire air-pressure according to a fifth aspect of the present invention is an apparatus for alarming a decrease in internal air-pressure of a tire based on rotational information obtained from tires attached to a four-wheeled vehicle. A relative speed ratio of driving wheels at the time of actual running is corrected based on a preliminarily stored relationship among the relative speed ratio of right and left tires of different types of driving wheels, vehicle speed and driving force, and a decrease in internal pressure of a tire is determined.

The apparatus for alarming a decrease in tire air-pressure according to a sixth aspect of the present invention is an apparatus for alarming decrease in internal air-pressure of a tire based on rotational information obtained from tires attached to a four-wheeled vehicle. The devise includes a rotational information detecting means for detecting rotational information of each tire, a storing means for storing the rotational information of each tire and relationships between relative speed ratios of right and left tires of different types of following wheels that have been preliminarily set to be of normal air-pressure and vehicle speed, a calculating and processing means for calculating determined values from rotational information of each tire, and a determining means for correcting relative speed ratios of right and left tires of different types of following wheels at the time of actual running. The correction are based on the relationship between the relative speed ratio of right and left tires of different types of following wheels and vehicle speed, and for determining a decrease in internal pressure of a tire.

The apparatus for alarming a decrease in tire air-pressure according to a seventh aspect of the present invention is an apparatus for alarming a decrease in internal air-pressure of a tire based on rotational information obtained from tires attached to a four-wheeled vehicle. The devise includes a rotational information detecting means for detecting rotational information of each tire, a storing means for storing the rotational information of each tire and relationships among relative speed ratios of right and left tires of different types of driving wheels that have been preliminarily set to be of normal air-pressure, vehicle speed and driving force, a calculating and processing means for calculating determined values from rotational information of each tire, and a determining means for correcting relative speed ratios of right and left tires of different types of driving wheels at the time of actual running. The correction are based on the relationship among relative speed ratio of right and left tires of different types of driving wheels, vehicle speed and driving force, and for determining a decrease in internal pressure of a tire.

The method for alarming a decrease in tire air-pressure according to an eighth aspect of the present invention is a method for alarming a decrease in internal air-pressure of a tire based on rotational information obtained from tires attached to a four-wheeled vehicle. A relative speed ratio of following wheels at the time of actual running is corrected based on a preliminarily stored relationship between the relative speed ratio of right and left tires of different types of following wheels and vehicle speed, and a decrease in internal pressure of a tire is determined.

The method for alarming a decrease in tire air-pressure according to a ninth aspect of the present invention is a method for alarming decrease in internal air-pressure of a tire based on rotational information that can be obtained from tires attached to a four-wheeled vehicle. A relative speed ratio of driving wheels at the time of actual running is corrected based on a preliminarily stored relationship among the relative speed ratio of right and left tires of different types of driving wheels, vehicle speed and driving force, and a decrease in internal pressure of a tire is determined.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The apparatus for alarming a decrease in tire air-pressure and a method thereof according to the present invention will now be explained with reference to the accompanying drawings.

EMBODIMENT 1

Figure 1:
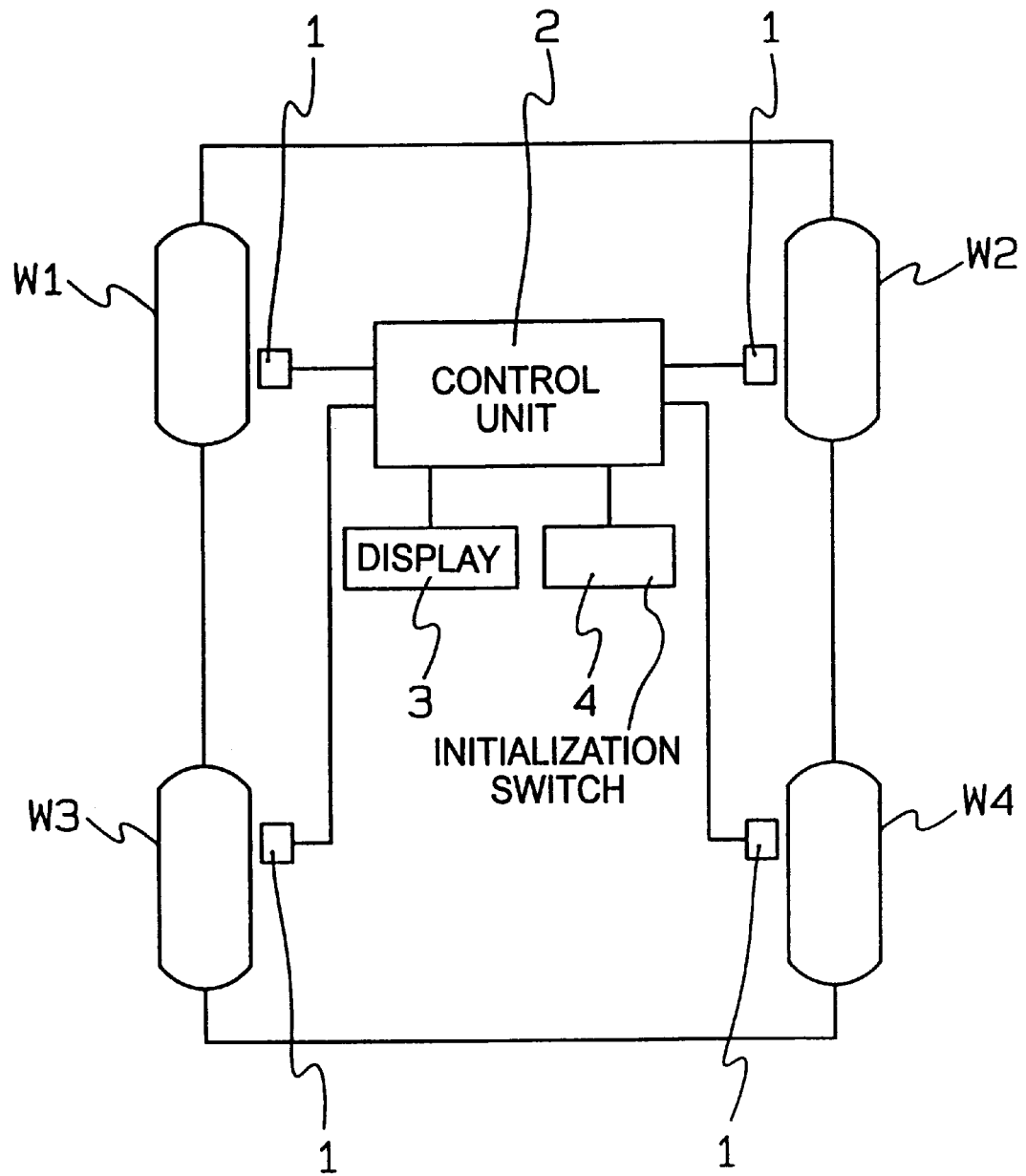
FIG. 1 is a block diagram showing one embodiment of an apparatus for alarming a decrease in tire air-pressure according to the present invention.

As shown in FIG. 1, the apparatus for alarming a decrease in air-pressure detects whether an air- pressure of any of the four wheels $W_1$, $W_2$ $W_3$ and $W_4$ (hereinafter referred to as "$W_i$," when they are called generally) attached to a four-wheeled vehicle has decreased or not. The devise includes wheel speed sensors 1 of normal arrangement respectively arranged in connection with each of the tires $W_i$. The wheel speed sensor 1 detects rotational information of each tire, e.g. number of rotations, revolution speed or angular speed. Outputs of the wheel speed sensors 1 are supplied to a control unit 2. To the control unit 2, there are connected a display means 3 comprising a crystal display element, plasma display element, CRT, lamp or sound generator for informing a tire $W_i$ of which air-pressure has decreased, and an initializing switch 4 which can be operated, for instance, by a driver.

Figure 2:
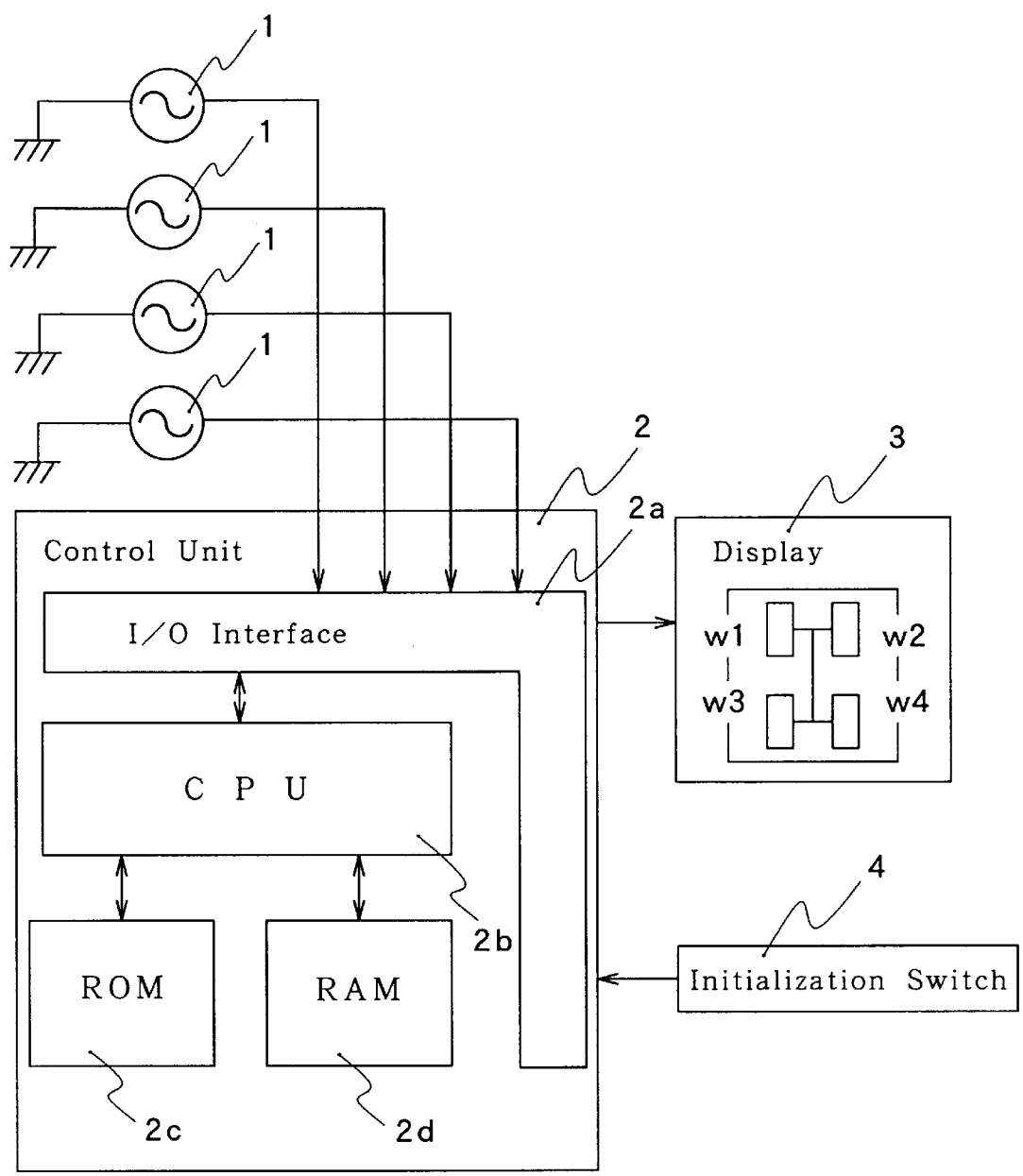
FIG. 2 is a block diagram showing electric arrangements of the apparatus for alarming a decrease in tire air-pressure of FIG. 1.

The control unit 2 comprises a wheel speed sensor 1 which is a rotational information detecting means for detecting rotational information of each tire $W_i$, a storing means for storing rotational information of each tire $W_i$ and relationships between right and left wheel ratios of right and left tires of different types of driving wheels which have been preliminarily set to be of normal air-pressure and driving force, a calculating and processing means for calculating determined values from the rotational information of each tire $W_i$, and a determining means for correcting right and left wheel ratios of driving wheels at the time of actual running. The correction are based on the relationship between the right and left wheel ratios of right and left tires of different types and driving force, and for determining a decrease in internal pressure of a tire. As shown in FIG. 2, the control unit 2 is composed of an I/O interface 2a required for sending/receiving signals to/from an external device, a CPU 2b which functions as a center of calculation, a ROM 2c which stores a control operation program for the CPU 2b, and a RAM 2d into which data are temporally written and from which they are read out when the CPU 2b performs control operations.

Right and left tires of different types of driving wheels which have been set to be of normal air-pressure might, for instance, be a new tire and a worn tire of which degree of wear is 50%, or two types of tires of which front and rear rigidity vary, e.g. a summer tire and a winter tire.

Next, the present invention will be explained based on a case in which a new tire and a worn tire are attached to the driving shaft of a rear wheel driving vehicle (FR vehicle).

Let us consider a case in which tires of the same type are attached under a condition as shown in Table 1 to perform initialization. Initialization is performed without setting any particular methods for running but is performed by actually running on general roads, and the system periodically calculates a revolution speed of each tire $W_i$ during these procedures. It should be noted that each tire is manufactured in variations (initial differences) which are tolerated within a certain standard, the effective turning radius of each tire $W_i$ might not necessarily be identical so that the revolution speeds $V_i$ of all tires $W_i$ might not be identical even under normal air-pressure. Therefore, revolution speeds $V1_i$ after correction of the variations owing to initial differences are calculated by the following equations (1) to (4).

$$V1_1 = V_1 \quad (1)$$

$$V1_2 = mV_2 \quad (2)$$

$$V1_3 = V_3 \quad (3)$$

$$V1_4 = nV_4 \quad (4)$$

The coefficient m is obtained as a right and left wheel ratio of the right and left tires of the following wheels ($V_1/V_2$), and the coefficient n as a right and left wheel ratio of the right and left tires of the driving wheels ($V_3/V_4$). The right and left wheel ratios obtained at this time are averaged values of values periodically calculated under various running conditions during initialization. Then, a determined value is calculated based on the revolution speed $V1_i$. This determined value is obtained from the following equation (5) in the case where the difference between two diagonal sums is set to be the determined value (DEL value)

$$DEL = \frac{\frac{V1_1 + V1_4}{2} - \frac{V1_2 + V1_3}{2}}{\frac{V1_1 + V1_2 + V1_3 + V1_4}{4}} \times 100 \quad (5)$$

TABLE 1

| SAMPLE VEHICLE | FR VEHICLE |
| --- | --- |
| TIRE SIZE | 245/60R16 |
| NUMBER OF PASSENGER | 2 |

Figure 3:
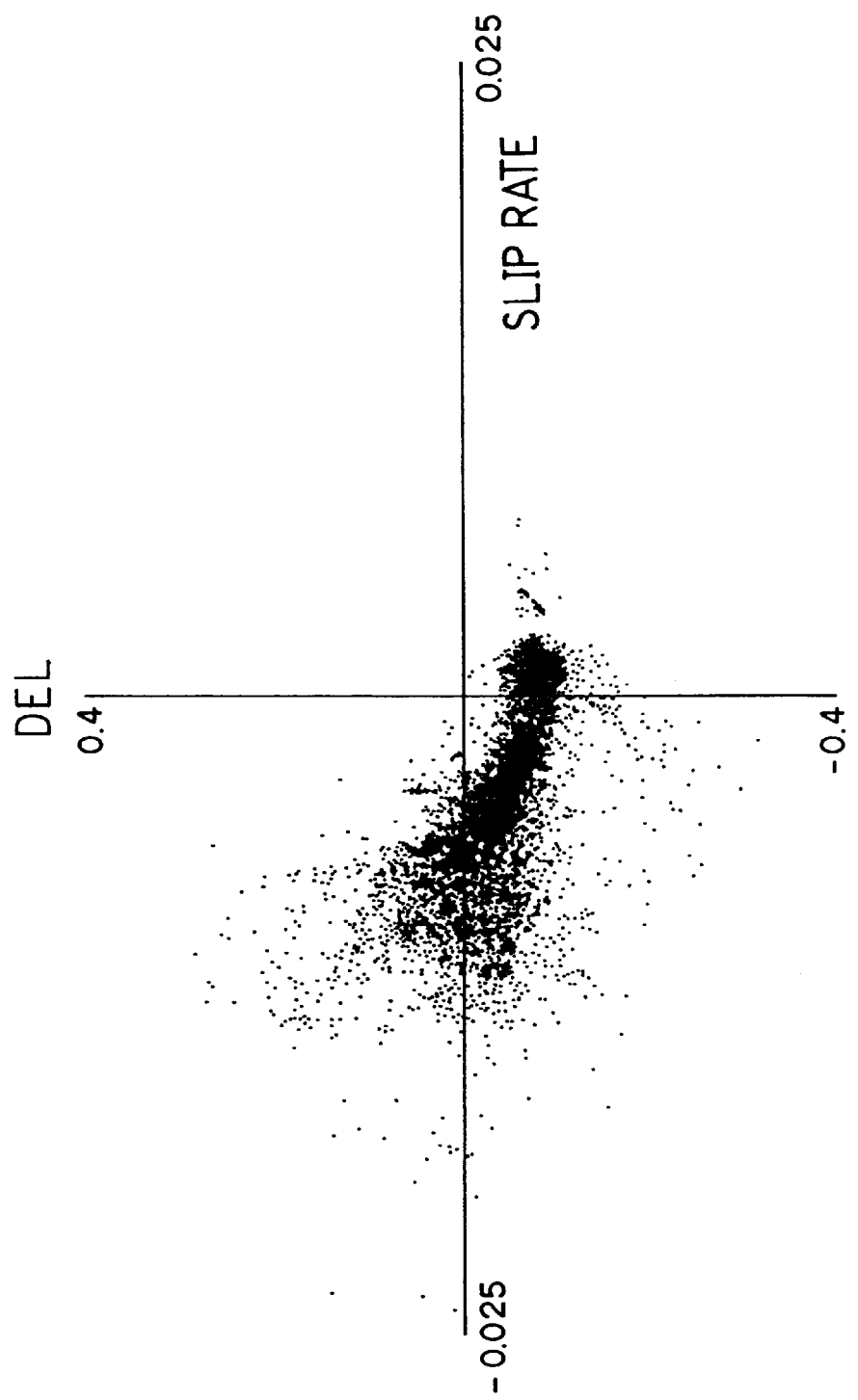
FIG. 3 is a diagram showing relationships between slip rates and determined values.

Next, it is considered of a case in which a blowout of one of the driving wheels has occurred after the vehicle has performed running to some extent, and from among the four tires which are worn by approximately 40%, the right tire of the driving wheels is exchanged with a new spare tire. At this time, the right and left wheel ratios m, n are non-ambiguously obtained as averaged values of various running conditions. When DEL values are obtained through driving at various driving conditions with the use of such ratios, erroneous alarm is apt to occur though the tires are at normal air-pressure when the driving force or braking force is large, since the DEL values are sloped with respect to the slip rates as shown in FIG. 3. This is because relative speed differences (fluctuations with respect to 1) occur for the right and left ratios $V_3/V_4$ of the right and left tires of the driving wheels, as shown in FIG. 18.

Thus, right and left wheel ratios due to driving force generated at the time of actual running are corrected and a decrease in internal pressure of a tire is determined in the present invention by preliminarily storing how the right and left wheel ratios of right and left tires of different type of the driving wheels which have been set to be at normal air-pressure vary by the influence of driving force.

Figure 18:
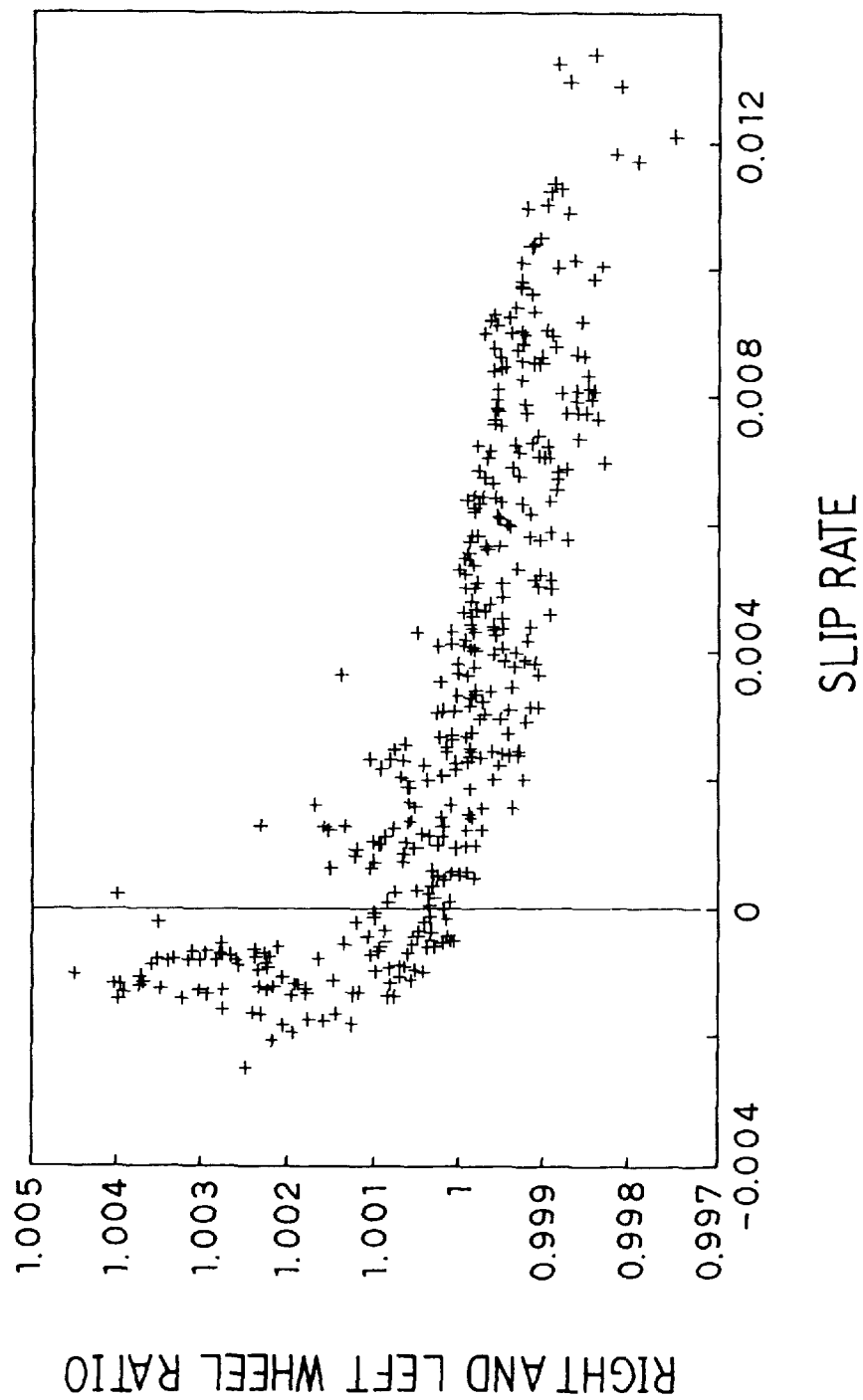
FIG. 18 is a diagram showing relationships between right and left wheel ratios of right and left tires of different types of driving wheels and slip rates.

In other words, it is general that initialization is performed at the time of exchanging a tire in a system for determining decompression based on differences in relative wheel speed of tires, so that slip rates are calculated by sampling front and rear wheel ratios simultaneously with sampling of wheel speed data at the time of actual running, and it is then obtained how the right and left wheel ratios of tires of different types of driving wheels vary upon influence of driving force (which is expressed by a slip rate calculated by (front and rear wheel ratio −1)), At this time, the right and left wheel ratio ($V_3/V_4$) is made, upon conversion of the slip rate and FIG. 18, to be (constant)·(slip rate)=(constant)·(front and rear wheel ratio −1), and is regressed as a linear function of the front and rear wheel ratios $(V_3+V_4)/(V_1+V_2)$ as in the following equation (6).

$$\frac{V_3}{V_4} = A\left(\frac{V_3+V_4}{V_1+V_2}\right) + B \quad (6)$$

Note that A and B are constants.

Figure 4:
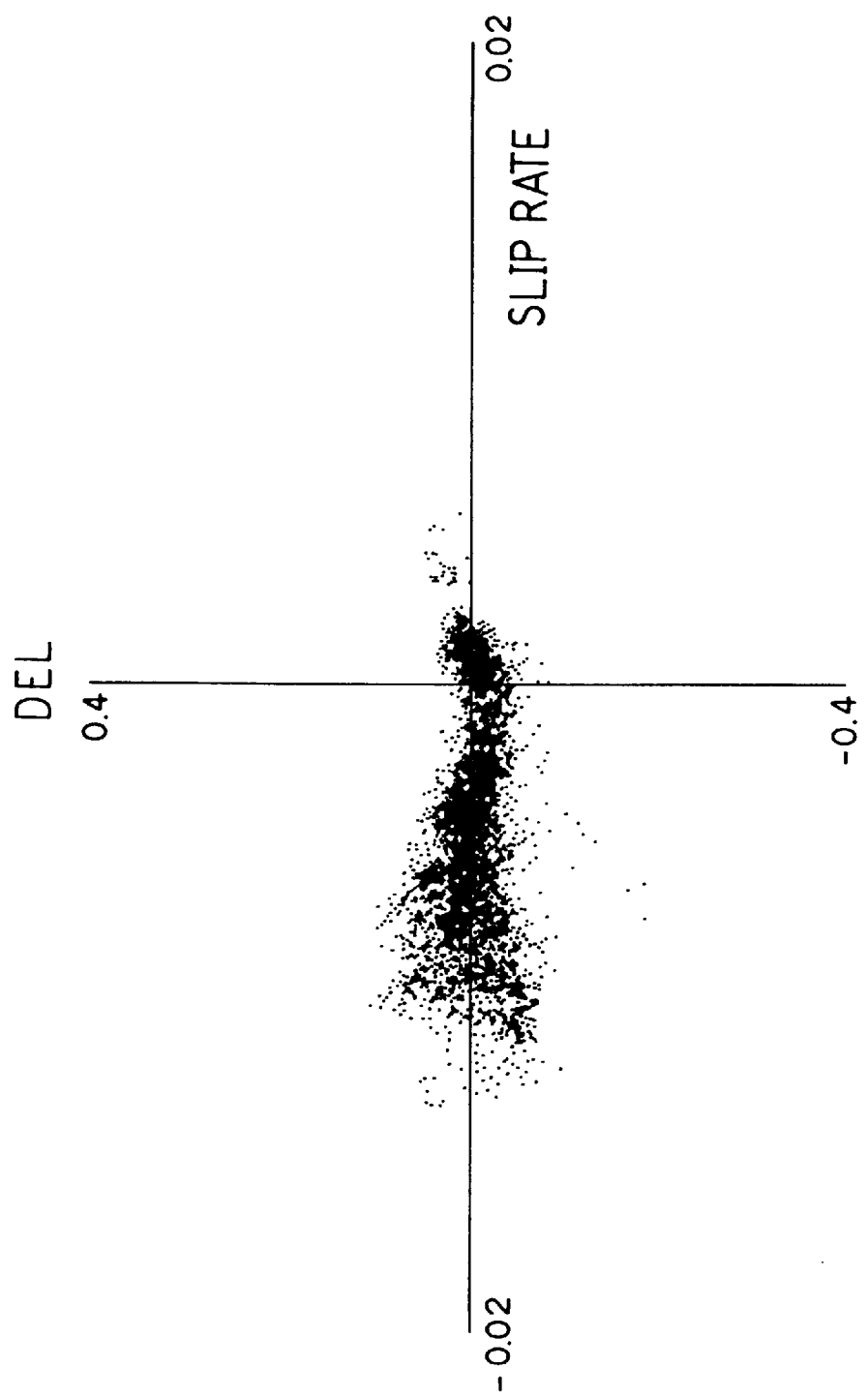
FIG. 4 is a diagram showing relationships between slip rates and determined values after correction by using the slip rates.

Since the right and left wheel ratios after completion of initialization are obtained by the equation (6), when equation (6) is assigned into equation (5), the DEL values in which right and left wheel ratios of the driving wheels are corrected by slip rates will no more be sloped with respect to the slip rates as shown in FIG. 4, whereby erroneous alarm can be eliminated even when the driving force/braking force is large.

While the present embodiment has been explained by taking case of a FR vehicle, the right and left wheel ratios $(V_1/V_2)$ of the driving heels of a FF vehicle will be regressed as a linear function of the front and rear wheel ratios $(V_1+V_2)/(V_3+V_4)$ as in the following equation (7), so that the DEL values can also be corrected by the slip rates by assigning the equation (7) into equation (5), similarly to the case of a FR vehicle.

$$\frac{V_1}{V_2} = A\left(\frac{V_1+V_2}{V_3+V_4}\right) + B \quad (7)$$

It should be noted that the reason for setting definitions of front and rear wheel ratios to $(V_3+V_4)/(V_1+V_2)$ in the case of a FR vehicle and $(V_1+V_2)/(V_3+V_4)$ in the case of a FF vehicle is that the slip rate is defined to be (front and rear wheel ratio −1) and the driving wheel side needs to be the numerator in order to make the driving force side be consistently positive.

According to the present embodiment, the right and left wheel ratios of driving wheels at the time of running can be accurately corrected since there is preliminarily stored, for example, at initialization under actual running performed when a tire has been exchanged, how the right and left wheel ratios of right and left tires of different types of driving wheels and slip rates due to driving force vary. Consequently, the accuracy of determining a decrease in internal pressure of a tire is improved and erroneous alarm or failure in alarm can be prevented.

Next, an embodiment of the present invention will be explained based on an example thereof, while the present invention is not limited to such an example only.

EXAMPLE

An exemplary case will be discussed in which a blowout of a tire on the right-hand side of the driving wheels has occurred while the tires of the driving wheels of a FR vehicle have worn by approximately 50%.

The driver exchanges the tire on the right-hand side of the driving wheels with a new tire. At this time, tires of different types and of different degrees of wear are concurrently used for the driving wheels. In a system for detecting a decrease in tire air-pressure based on relative comparison of wheel speeds, initializing operations are performed in order to correct differences in outer diameter of the tires. As described earlier, these operations are for measuring right and left wheel ratios of tire dynamic load radiuses at normal air-pressure. In the case where the degrees of wear of right and left tires are substantially equal, the right and left wheel ratios are constant, irrespective of driving force or braking force (driving force/braking force) or the revolution speed, and are corrected by the equations (1) to (4). However, in the case where the degrees of wear differ between right and left tires of the driving wheels, the right and left wheel ratios of the driving wheels are dependent on the magnitude of driving force/braking force. Thus, the system obtains the right and left wheel ratios of the driving wheels as a function of the driving force/braking force. The system performs sampling of right and left wheel ratios of wheel speeds and (front and rear wheel ratio −1) in a second as one data, and a specified number of data are obtained. The results are shown in FIG. 5.

Figure 5:
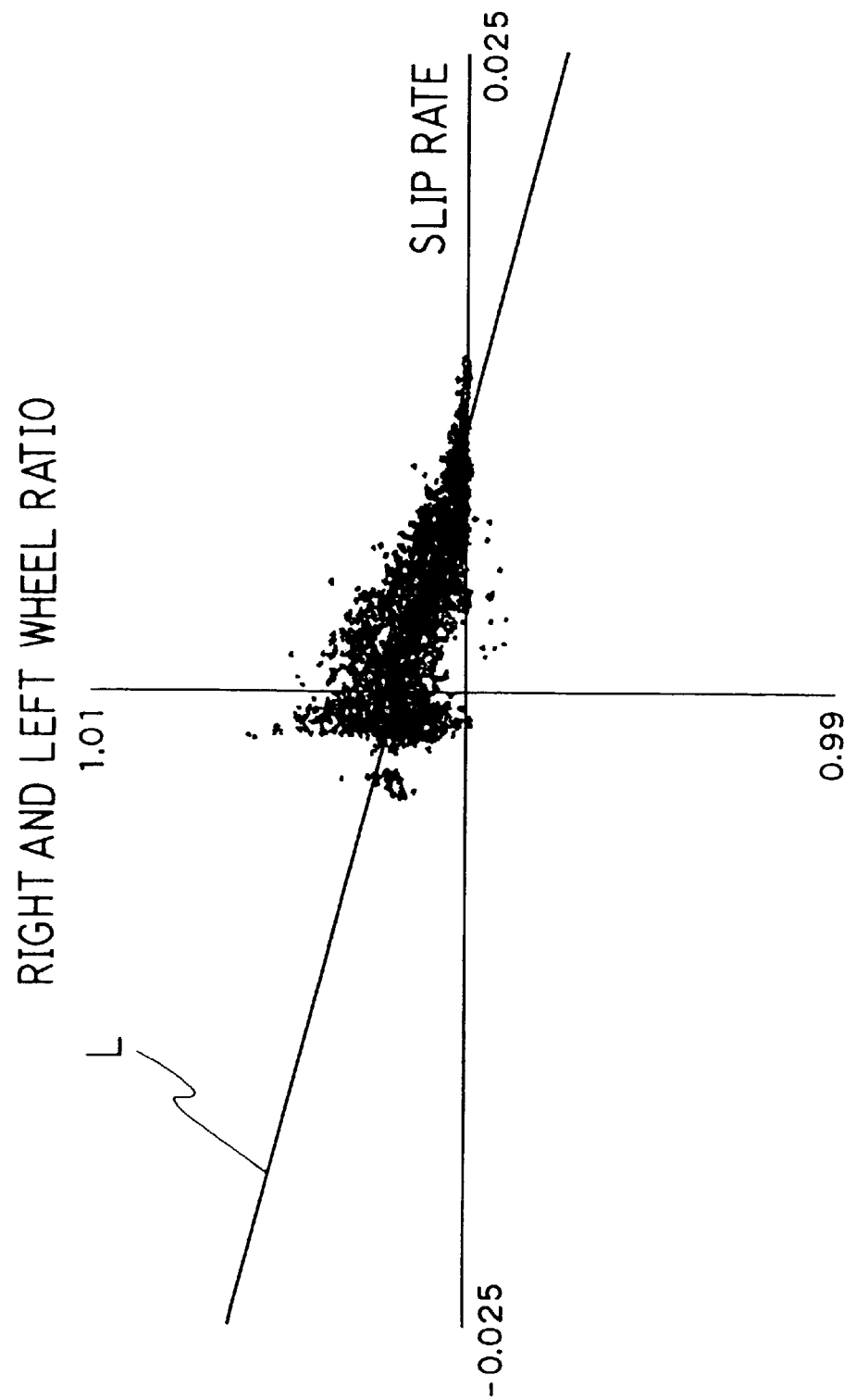
FIG. 5 is a diagram showing relationships between relative speed ratios of right and left tires of different types of driving wheels (hereinafter referred to as "right and left wheel ratios") and driving force/braking force.

In the case where the degrees of wear between the right and left wheels are substantially identical, these data are distributed in a substantially horizontal manner; however, in the case where the degrees of wear between the right and left wheels are different as in the present example, they are sloped as shown in FIG. 5. By regressing these as a straight line (linear function) L, coefficients A and B of equation (6) are obtained. It should be noted that when the vehicle is of FF type, coefficients A and B of equation (7) are obtained.

In the present example, A was −0.178023 and B 1.179873. Thus, the right and left wheel ratio of the driving wheels n $(V_3/V_4)$ will be as follows.

$$n = -0.178023 \times (V_3+V_4)/(V_1+V_2) + 1.179873$$

Initialization is completed when the right and left wheel ratio m of the following wheels $(V_1/V_2)$ and right and left wheel ratio n of the driving wheels $(V_3/V_4)$ are obtained.

The processes for determining decompression will now be explained. First, the system performs sampling of wheel speeds $V_1$, $V_2$, $V_3$, and $V_4$ at each second. It is preferable that data including many errors are omitted at this time. Then, correction is performed based on equations (1) to (4) by employing right and left wheel ratios m, n.

The determined value DEL is calculated in accordance with equation (5), compared with a set threshold, and if this is exceeded, alarm is released.

EMBODIMENT 2

Figure 6:
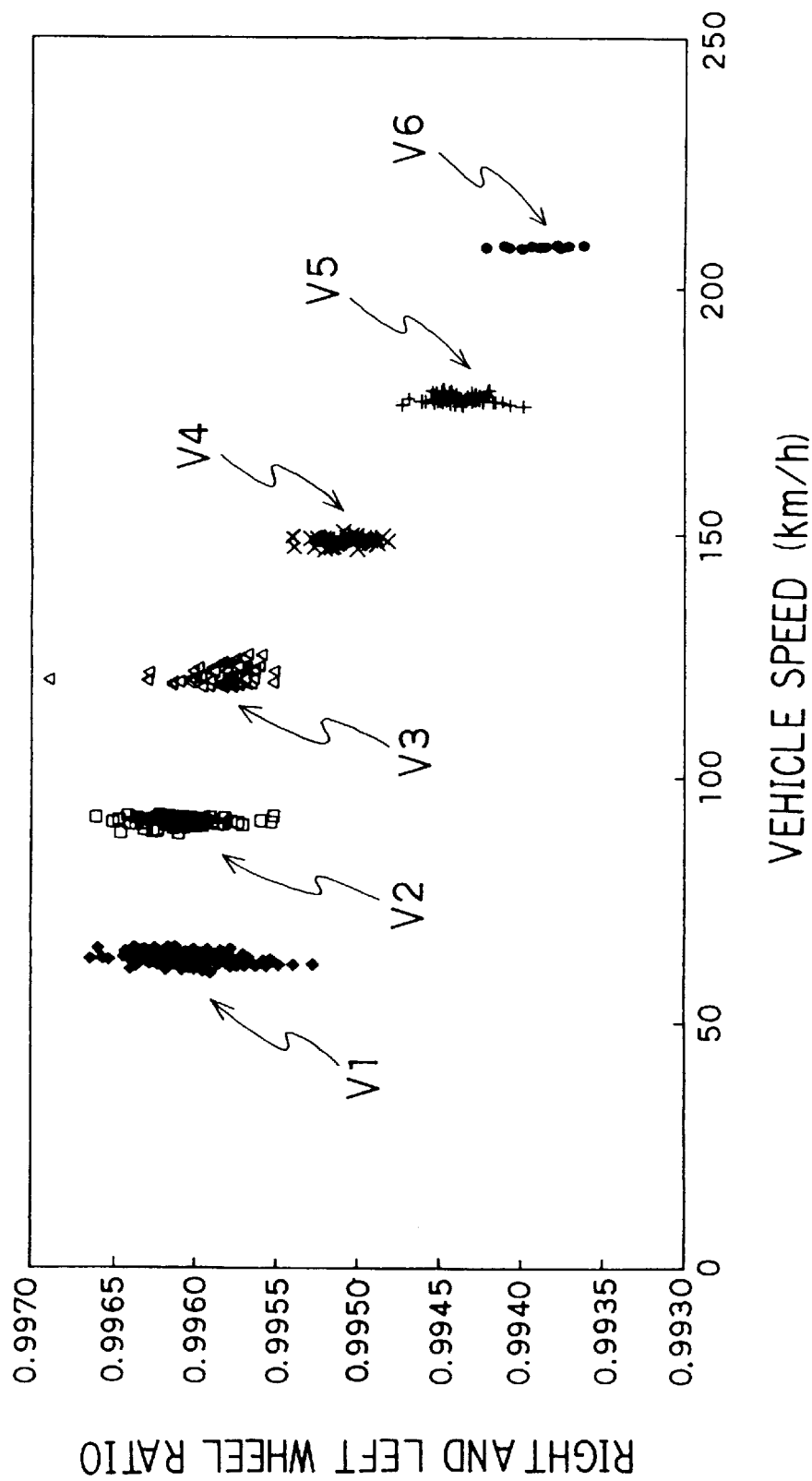
FIG. 6 is a diagram showing relationships between right and left wheel ratios of right and left tires of different types of following wheels and vehicle speed.

Another exemplary embodiment of the present invention will now be explained. As shown in FIG. 6, driving tests are performed with a rear wheel driving vehicle (FR vehicle) of which following shaft bears right and left tires of different types, namely a new tire and a worn tire, and the driving speed is increased from 60 km/hour by 30 km/h up to a speed of 210 km/h ($V_1$ to $V_6$). The right and left wheel ratios are substantially constant as long as the vehicle speed is not more than approximately 120 km/h. However, when the vehicle speed exceeds approximately 120 km/h, the right and left wheel ratios of the following wheels become shifted (not constant).

Figure 7:
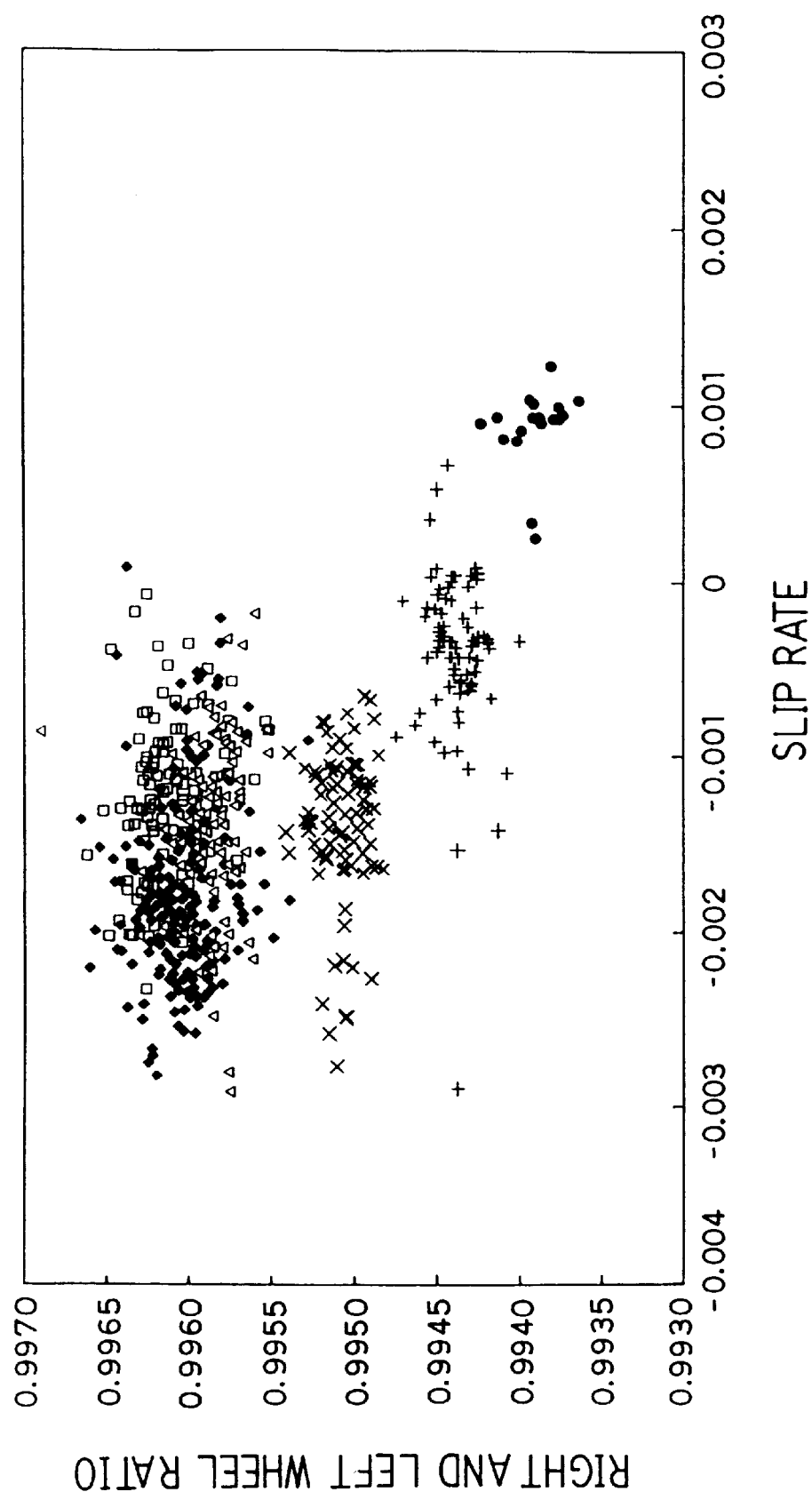
FIG. 7 is a diagram showing relationships between right and left wheel ratios of right and left tires of different types of following wheels and slip rates.

Thus, it can be understood that the right and left wheel ratios of the following wheels are correlated as squares of the vehicle speed, as shown in FIG. 6. This can be explained by the fact that tires which differ in degrees of wear on the right and left side cause differences in centrifugal force acting on the right and left tires since there exist differences in tread weight and thus result in a correlation of the right and left differences to a square of speed. However, as shown in FIG. 7, it can be understood that the right and left wheel ratios are not dependent on the driving force (corresponding to relative slip rates) expressed as slip rates calculated from (front and rear wheel ratio −1). Thus, the correction values for the right and left wheel ratios of the following wheels are obtained from a quadratic function for the vehicle speed in the present embodiment. However, since a slope of 0 is also acceptable when the vehicle speed is 0, if the linear coefficient is set to be 0 for ease of correction, the following equation (8) will be obtained.

$$Vnr = Vnr \times (Kna \times V\text{mean}^2 + Knb) \quad (8)$$

Note that

Vnr: revolution speed of the right tire of the following wheels

Vmeans: averaged value for revolution speeds of the four tires

Kna: quadratic correction coefficient for the vehicle speed

Knb: zero-order correction coefficient for the vehicle speed

The correction coefficients Kna, Knb can be obtained by regressing (Kna×Vmean²+Knb) as a linear function of Vmean.

That is, calculation of the correction coefficients may be obtained from the following equation (9).

$$Kna = (N \times Snxy - Snx \times Sny)/(N \times Snx2 - Snx \times Snx) Knb = (Sny - Kna \times Snx)/N \quad (9)$$

Note that

N: number of data

Snx: integrated value of a square of the vehicle speed

Sny: integrated value of Vnl/Vnr

Snxy: integrated value of a product of a square of the vehicle speed and Vnl/Vnr Snx2: integrated value of the vehicle speed multiplied by four Vnl: revolution speed of the left tire of the following wheels Vnr: revolution speed of the right tire of the following wheels It should be noted that the equations for correction corresponding to the equation (2) of Embodiment 1 are expressed by the following equations (10), (11).

$$Vnr = Vnr \times Ka \quad (10)$$

$$Ka = Sny/N \quad (11)$$

Note that

Vnr: revolution speed of the right tire of the following wheels

Ka: correction coefficient

N: number of data

Sny: integrated value of Vnl/Vnr

Figure 8:
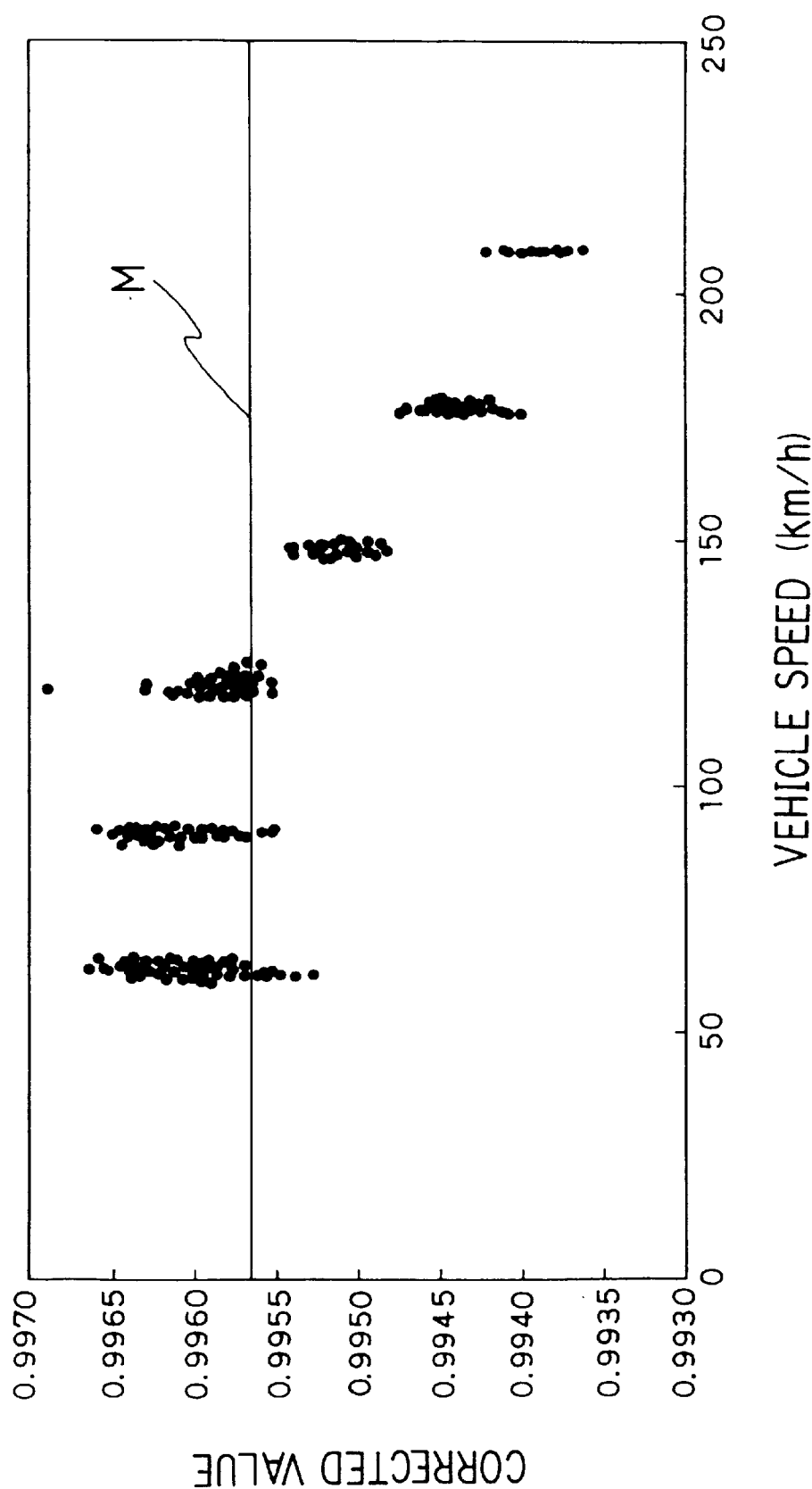
FIG. 8 is a diagram showing averaged values of right and left wheel ratios and correction values corrected by a quadratic function for correction for vehicles speeds according to Embodiment 2.
Figure 9:
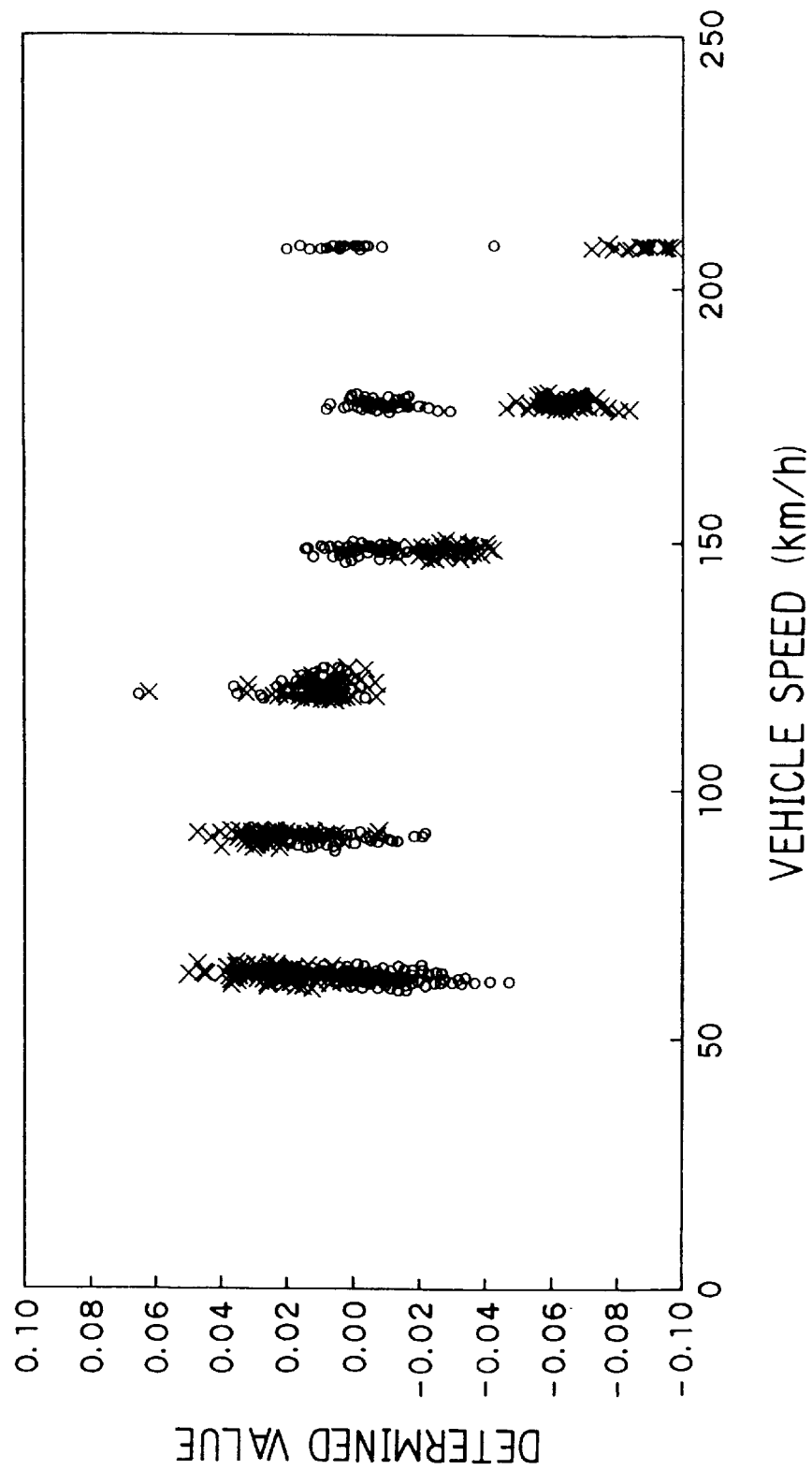
FIG. 9 is a diagram showing determined values employing averaged values of right and left wheel ratios and determined values in which the right and left wheel ratios have been corrected by the quadratic function for the vehicle speed.

Thus, it can be understood from FIG. 8 showing averaged values of right and left wheel ratios which are correction coefficients in Embodiment 1 and correction values corrected by a quadratic function for correction for vehicles speeds according to the present embodiment and from FIG. 9 showing determined values calculated by employing right and left wheel ratios after performing these corrections, that the determined values should generally be substantially 0 at the time of normal internal pressure and shifted from 0 at the time of decompression; however, in the case of determined values employing averaged values M of the right and left wheel ratios (indicated by X marks), the determined values will be largely shifted from 0 and be close to −0.1 when the vehicle speed approaches 200 km/h even if the internal pressure is normal. On the other hand, determined values after correction of the right and left wheel ratios by the quadratic function for the vehicle speed according to the present embodiment (indicated by white ○ marks) will scarcely be shifted from 0 even if the vehicle speed becomes large.

Figure 14:
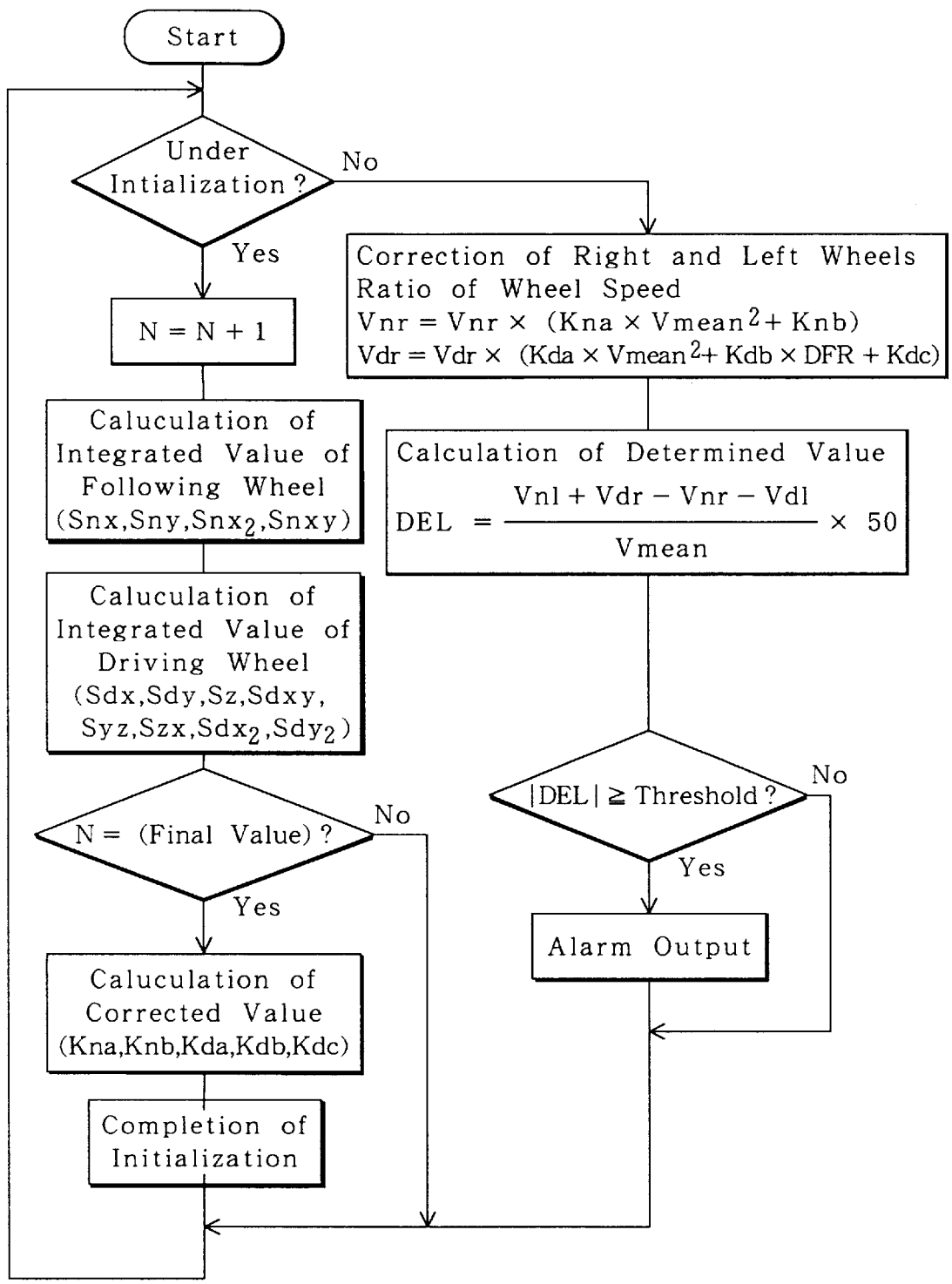
FIG. 14 is a flowchart of Embodiments 2 and 3.
Figure 15:
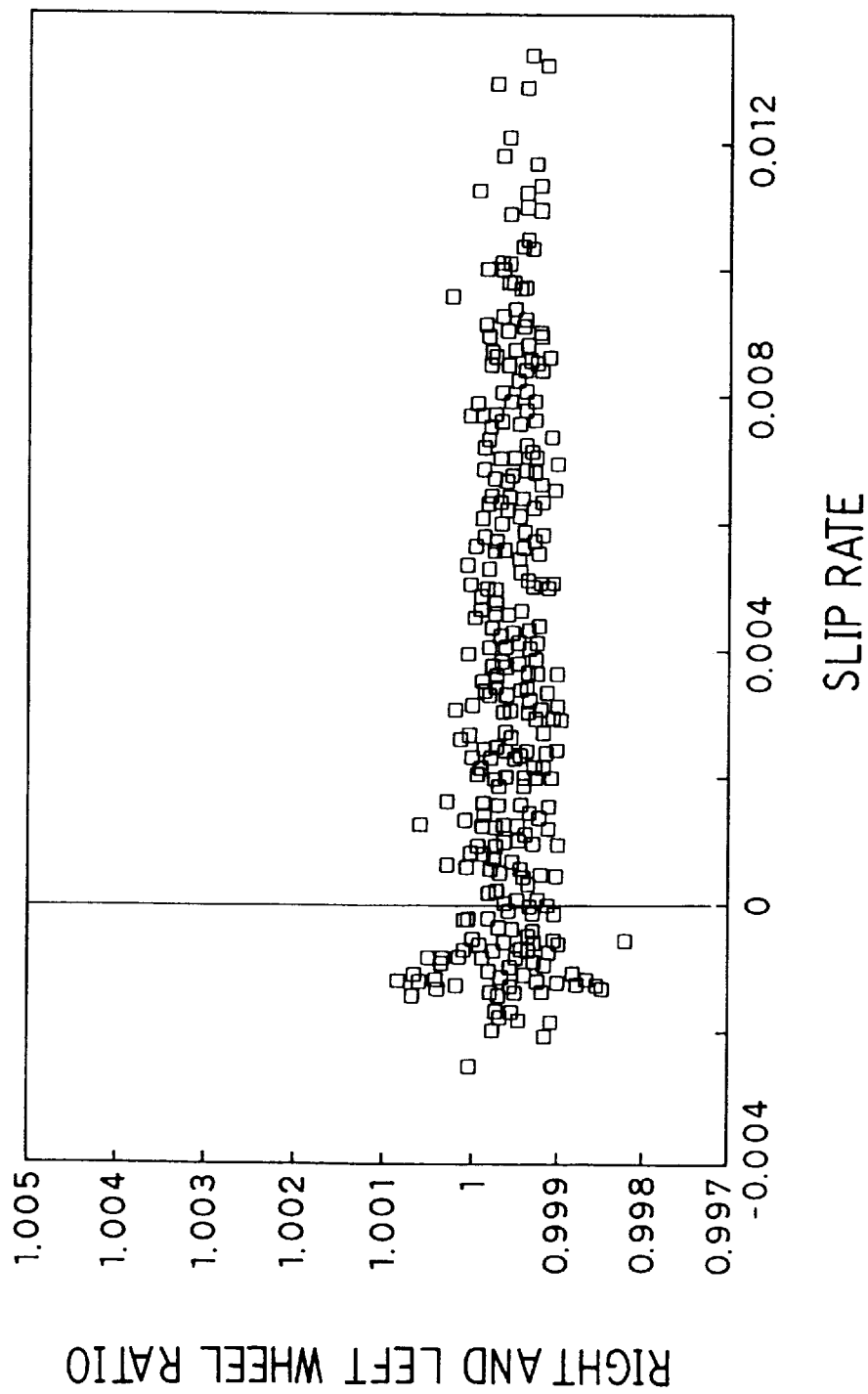
FIG. 15 is a diagram showing relationships between right and left wheel ratios of right and left tires of the same type of following wheels and slip rates.
Figure 16:
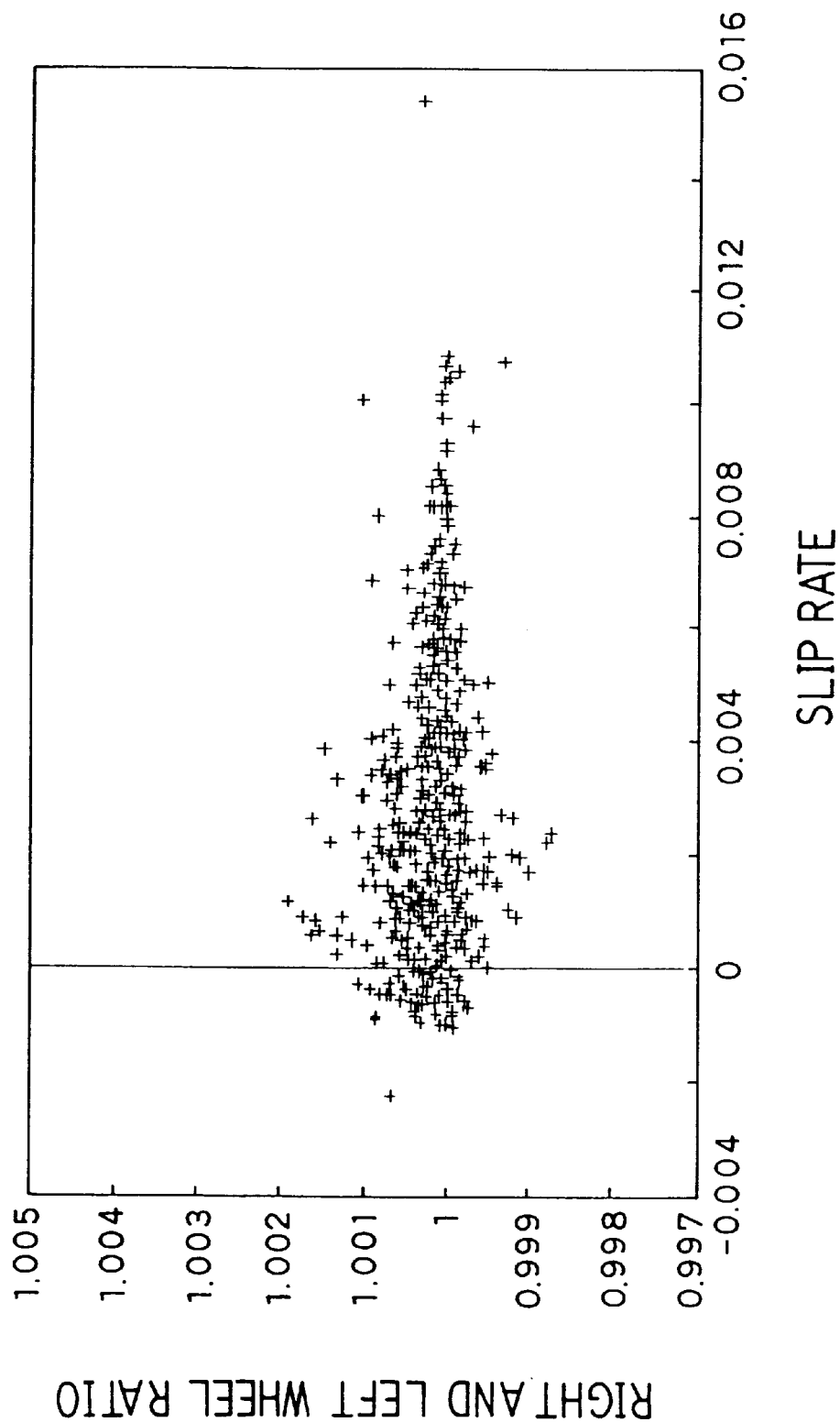
FIG. 16 is a diagram showing relationships between right and left wheel ratios of right and left tires of the same type of driving wheels and slip rates.
Figure 17:
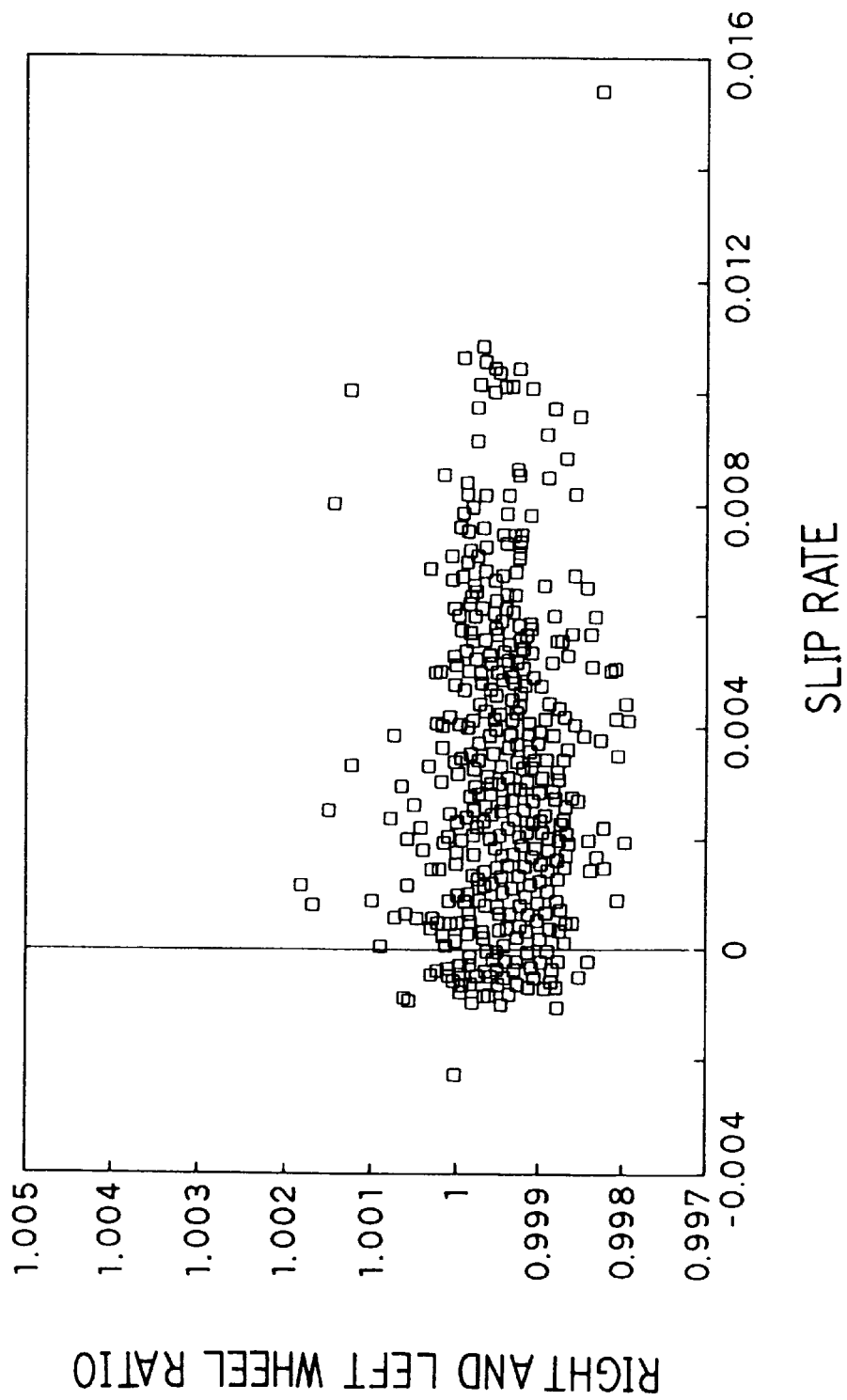
FIG. 17 is a diagram showing relationships between right and left wheel ratios of right and left tires of different types of following wheels and slip rates.

For this purpose, the control unit 2 comprises a wheel speed sensor 1 which is a rotational information detecting means for detecting rotational information of each tire $W_i$; a storing means for storing rotational information of each tire $W_i$; and relationships between right and left wheel ratios of right and left tires of different types of following wheels which have preliminarily been made to be of normal airpressure and vehicle speed; a calculating and processing means for calculating determined values from the rotational information of each tire $W_i$; and a determining means for correcting right and left wheel ratios of following wheels at the time of actual running based on the relationship between the right and left wheel ratios of right and left tires and vehicle speed and determining decrease in internal pressure of a tire. Alarm is generated when the thresholds of determined values exceed, e.g. a range of −0.1 to +0.1, based on the flowchart of FIG. 14. With this arrangement, the accuracy of determining a decrease in internal pressure of a tire at the time of running at a high speed can be further improved than compared to Embodiment 1, and erroneous alarm or failure in alarm can be prevented.

EMBODIMENT 3

Figure 11:
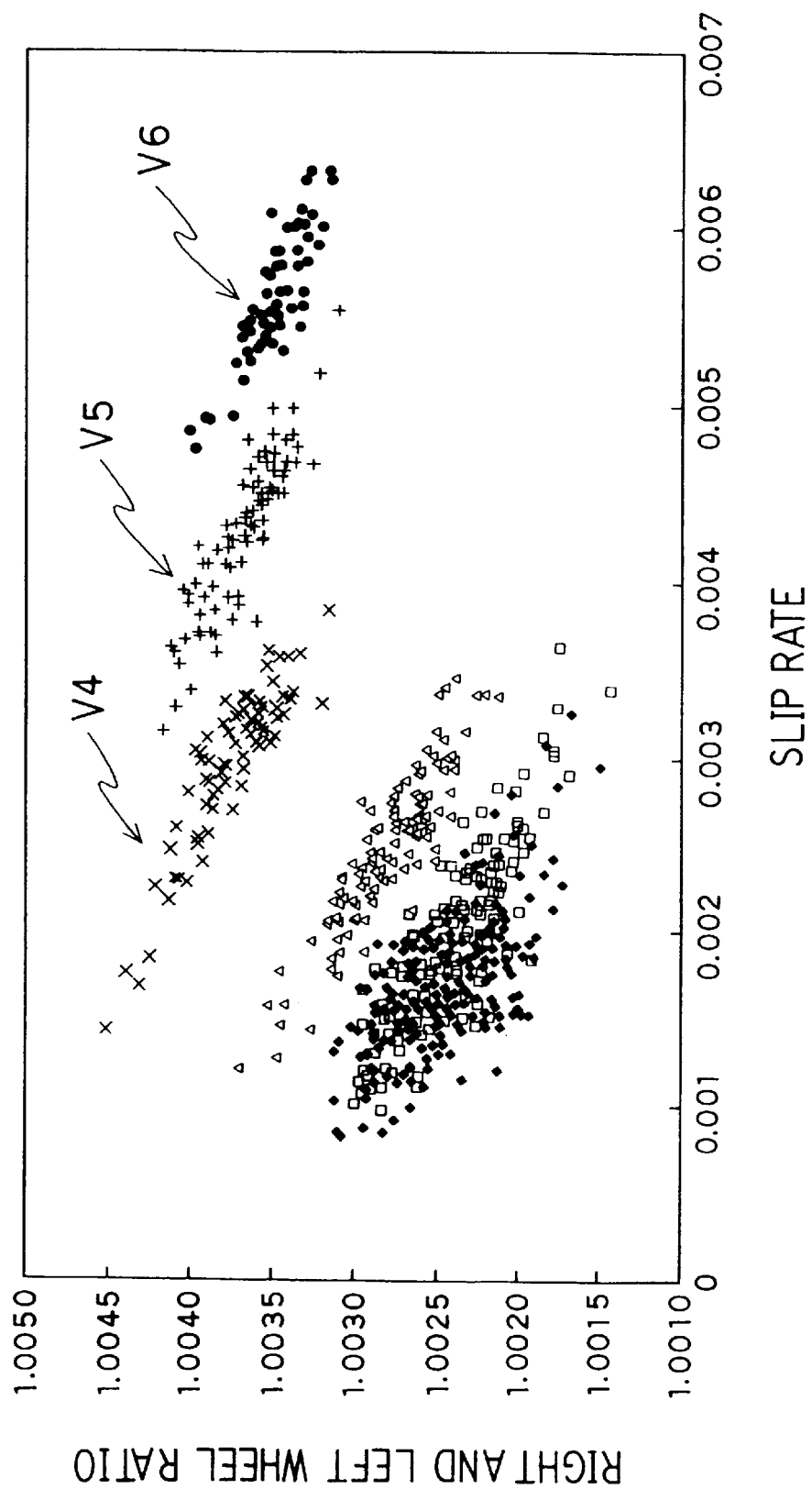
FIG. 11 is a diagram showing relationships among right and left wheel ratios of right and left tires of different types of driving wheels, vehicle speed, and driving force.

Another exemplary embodiment of the present invention will now be explained. While in Embodiment 1 relationships between right and left wheel ratios of driving wheels at straight-ahead running with tires of normal internal pressure and driving force are stored when right and left tires of different types are attached to the driving wheels, and the right and left wheel ratios of driving wheels are corrected with the use of stored relationships, the relationship between right and left wheel ratios and slip rates is varied due to the vehicle speed in case the vehicle speed is not less than approximately 120 km/h ($V_4$ to $V_6$) as shown in FIG. 11, and erroneous alarm or failure in alarm might undesirably occur.

Figure 10:
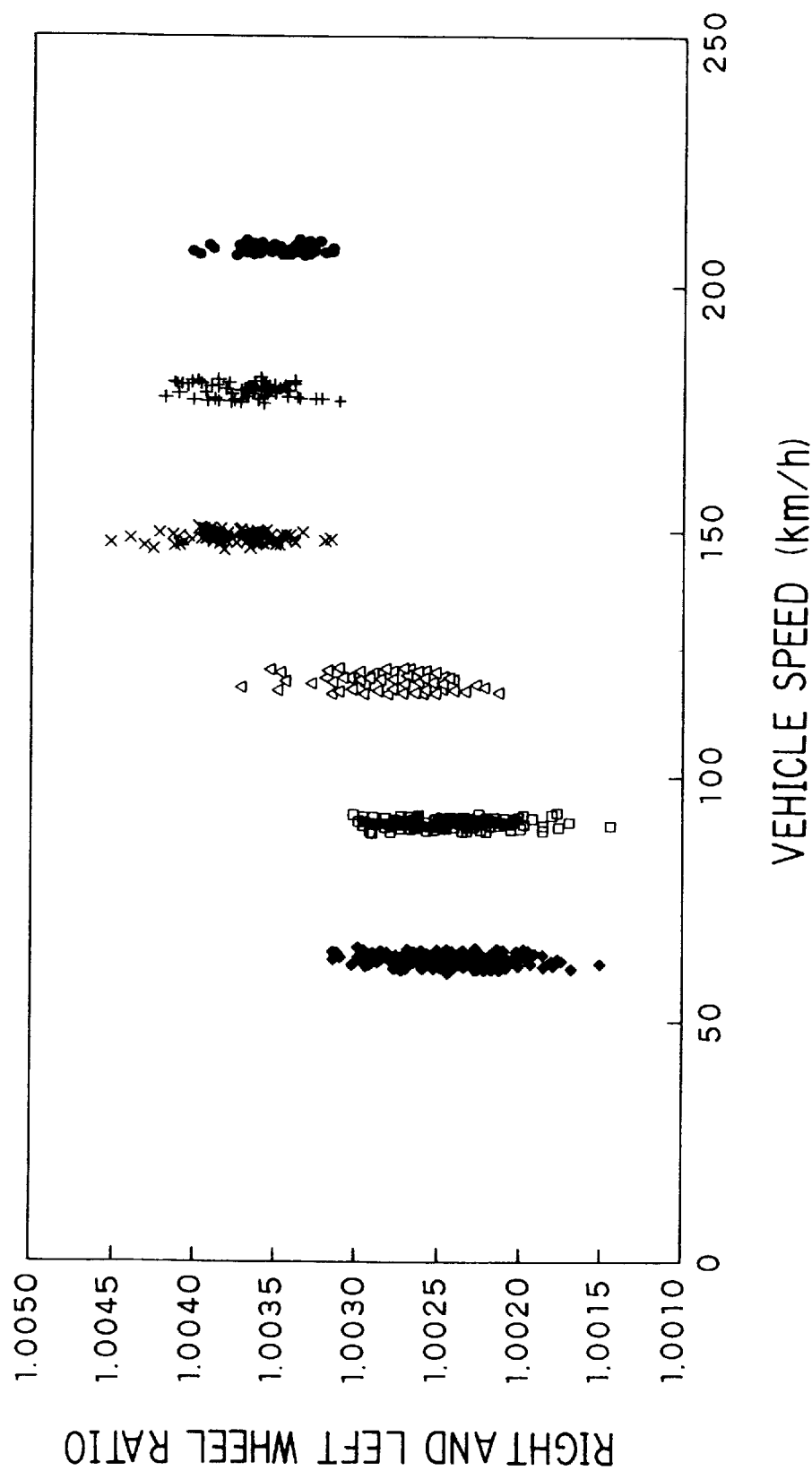
FIG. 10 is a diagram showing relationships between right and left wheel ratios of right and left tires of different types of driving wheels and vehicle speed.

Thus, driving tests have been performed with a vehicle which is a rear wheel driving vehicle (FR vehicle) of which the following shaft bears right and left tires of different types, namely a new tire and a worn tire, and the driving speed is increased from 60 km/hour by 30 km/h up to a speed of 210 km/h ($V_1$ to $V_6$). Consequently, it did not seem that there exists a correlation between the right and left wheel ratios with respect to the vehicle speed alone as shown in FIG. 10. As already described, the relationships between the right and left wheel ratios and slip rates vary depending upon the vehicle speed in case the vehicle speed exceeds 120 km/h, and considering that the right and left wheel ratios is related to the vehicle speed as well as to the driving force, it can be understood in FIG. 11 that it is in correlation with both the vehicle speed and driving force. Thus, correction values for the right and left wheel ratios of the driving wheels are selected based on the relationship thereof with the vehicle speed and the driving force.

Since the driving force as mentioned herein is equivalent to the slip rate, the driving force (DFR) can be expressed by the equation (front and rear wheel ratio $-1$)=(Vdl+Vdr)/(Vnl+Vnr)$-1$.

Since the equation for correction is set to be as a linear function for the driving force in equation (6) of the aforementioned Embodiment 1, it can be expressed by the following equation (12).

$$Vdr=Vdr \times (Kda \times DFR+Kdb) \qquad (12)$$

The correction coefficients are calculated by the following equations (13) and (14) through regression.

$$Kda=(N \times Syz-Sdy \times Sz)/(N \times Sdy2 \times Sdy \times Sdy) \qquad (13)$$

$$Kdb=(Sz-Kda \times Sdy)/N \qquad (14)$$

Note that
- Vdr: revolution speed of right tire of the driving wheels
- Kda: quadratic correction coefficient for the vehicle speed
- Kdb: correction coefficient for the driving force
- N: number of data
- Syz: integrated value of driving force and Vdr/Vdl
- Sdy: integrated value of driving force
- Sz: integrated value of Vdr/Vdl
- Sdy2: integrated value of a square of driving force
- Vdl: revolution speed of left tire of driving wheels Since centrifugal force actuates also onto the driving wheels, similarly to the case of the following wheels, a quadratic relationship exists between the right and left wheel ratios of the driving wheels and the vehicle speed, similarly to the case of the following wheels.

In other words, the following equation (15) can be obtained as a linear combination function of a quadratic function for the vehicle speed in case the vehicle speed in which the vehicle speed with respect to the right and left wheel ratios is of zero slope and of a linear function for the driving force.

$$Vdr=Vdr \times (Kda \times Vmean^2+Kdb \times DFR+Kdc) \qquad (15)$$

Note that
- Vdr: revolution speed of right tire of the driving wheels
- Vmean: average value of revolution speeds of tires of four wheels
- Kda: quadratic correction coefficient for vehicle speed
- Kdb: correction coefficient for driving force
- Kdc: quadratic correction coefficient for vehicle speed and zero-order correction coefficient for driving force Each of the correction coefficients can be obtained from the following equations (19) to (21) employing equations (16) to (18) by performing multiple regression of $Vmean^2$ and the driving force (DFR) with respect to Vdr/Vdl.

$$Ta=(N \times Szx \times Sdy2+Sdxy \times Sdy \times Sz+Sdxx \times Sdy \times Syz-Sdxx \times Sdy2 \times Sz-Szxx \\ Sdy \times Sdy-N \times Sdxy \times Syz) \qquad (16)$$

$$Tb=(N \times Syz \times Sdx2+Sdxy \times Sdxx \times Sz+Sdxx \times Sdy \times Szx-Sdy \times Sdx2 \times Sz-Syzx \\ Sdxx \times Sdx-N \times Sdxy \times Szx) \qquad (17)$$

$$Tc=(N \times Sdx2 \times Sdy2-Sdx2 \times Sdy \times Sdy-Sdy2 \times Sdxx \times Sdx-N \times Sdxy \times Sdxy+ \\ 2 \times Sdxy \times Sdxx \times Sdy) \qquad (18)$$

$$Kda=Ta/Tc \qquad (19)$$

$$Kda=Ta/Tc \qquad (20)$$

$$Kdc=Sz/N-KdaX\ Sdx/N-Kdb \times Sdy/N \qquad (21)$$

Figure 12:
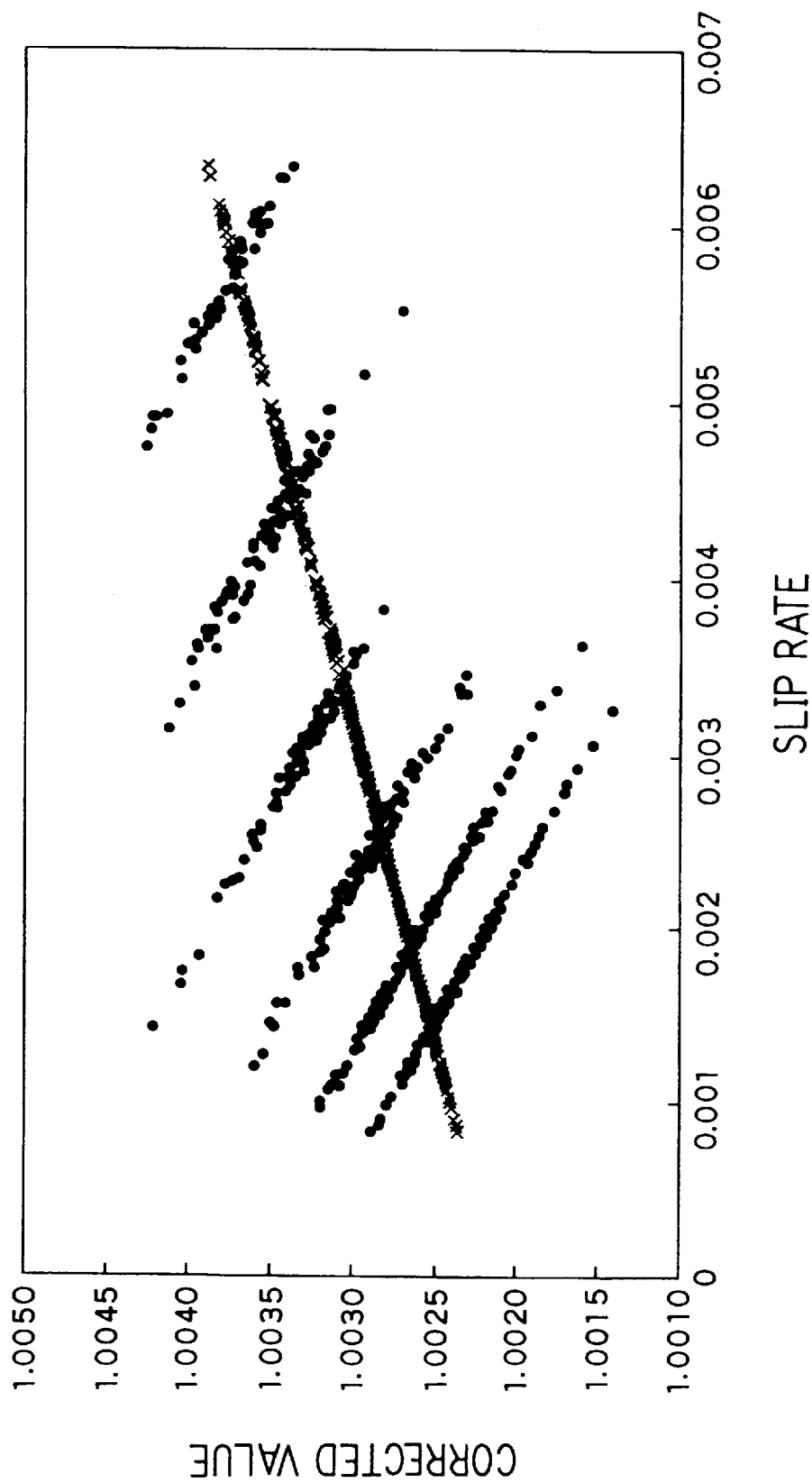
FIG. 12 is a diagram showing corrected values as corrected by the function for correction according to Embodiments 1 and 3.

Note that
- N: number of data employed for the regressive calculation
- Sdx: integrated value for a square of vehicle speed
- Sdy: integrated value for driving force
- Sz: integrated value for Vdr/Vdl
- Sdxy: integrated value of a product of a square of vehicle speed and driving force
- Syz: integrated value of driving force and Vdr/Vdl
- Szx: integrated value of a product of Vdr/Vdl and a square of vehicle speed
- Sdx2: integrated value of vehicle speed multiplied by four
- Sdy2: integrated value of a square of driving force
- Vdl: revolution speed of left tire of the driving wheels
- Vdr: revolution speed of right tire of the driving wheels In FIG. 12, there are respectively shown, by X marks and black ○ marks, corrected values obtained from a correction equation based on the driving force (slip rate) alone which are the corrected values of the preceding Embodiment 1 and corrected values obtained from a linear combination function of a quadratic function for the vehicle speed and a linear function for the driving force according to the present embodiment. It can be understood from FIG. 12 that the influence of the vehicle speed is not included and the correlation with respect to the driving force does not exist at all in the preceding Embodiment 1. On the other hand, it is obvious that a negative slope with respect to the driving force is formed and favorable correlation with respect to the entire speed region is obtained, based on the fact that almost all of the points overlap with the original data of FIG. 11.

Figure 13:
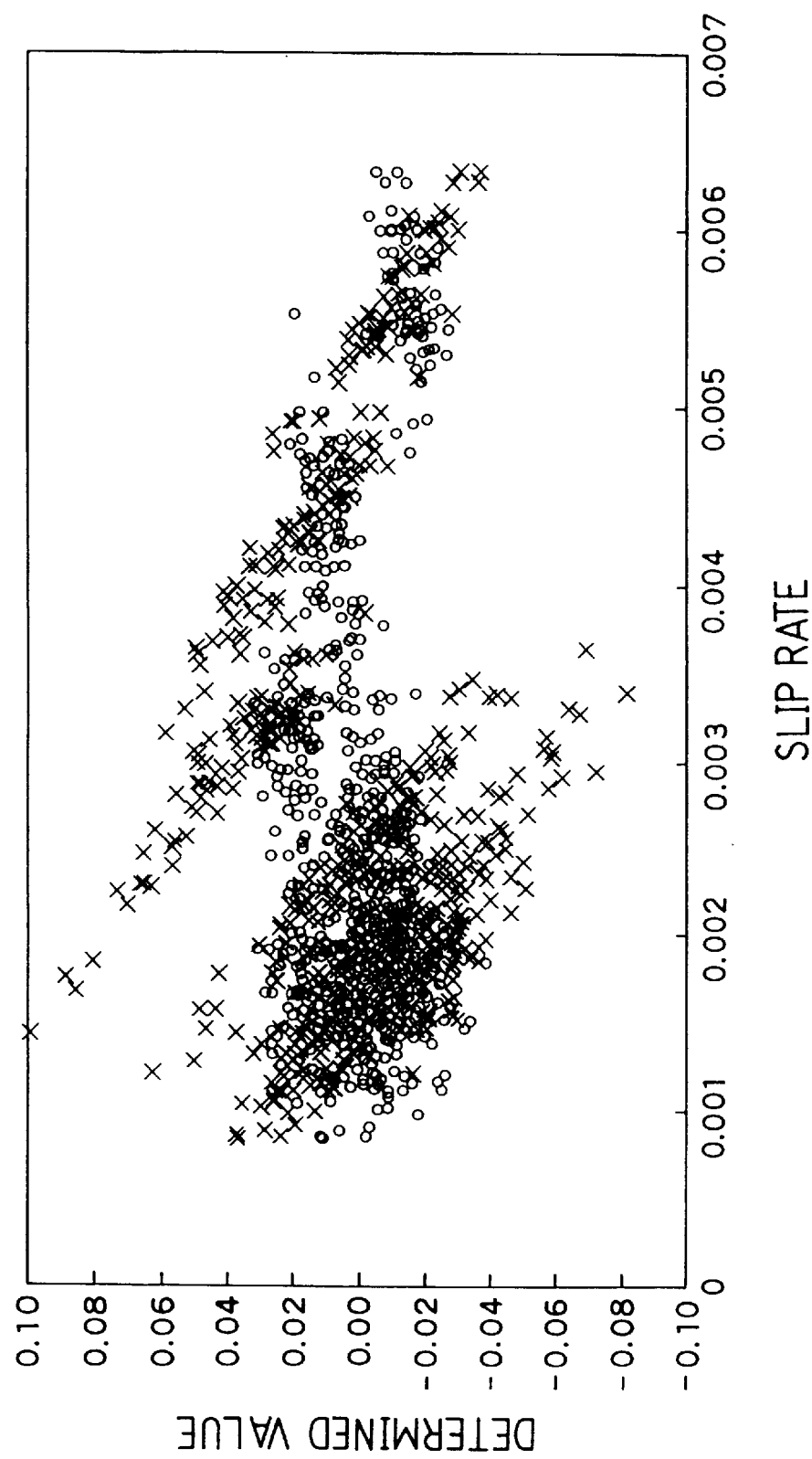
FIG. 13 is a diagram showing determined values in which right and left wheel ratios have been corrected based on driving force only and determined values in which right and left wheel ratios have been corrected by a linear combination function of a quadratic function for the vehicle speed and a linear function for the driving force.

Determined values calculated by employing right and left wheel ratios after performing such corrections are shown in FIG. 13. While determined values according to this embodiment are included in a width of substantially ±0.04, they extend up to ±0.1 in case corrected values based on driving force alone are employed according to the Embodiment 1.

In this manner, the control unit 2 comprises a rotational information detecting means for detecting rotational information of each tire $W_i$; a storing means for storing rotational information of each tire $W_i$ and relationships among right and left wheel ratios of right and left tires of different types of driving wheels which have preliminarily been made to be of normal air-pressure, vehicle speed and driving force; a calculating and processing means for calculating determined values from the rotational information of each tire $W_i$; and a determining means for correcting right and left wheel ratios of driving wheels. These corrections are made at the time of actual running based on the relationship among the right and left wheel ratios of right and left tires of different types, vehicle speed and driving force and for determining a decrease in internal pressure of a tire. Alarm is generated when the thresholds of determined values exceed, e.g. a range of $-0.1$ to $+0.1$, based on the flowchart of FIG. 14. With this arrangement, the accuracy of determining a decrease in internal pressure of a tire at the time of running at high speed can be further improved than compared to Embodiment 1, and erroneous alarm or failure in alarm can be prevented.

According to the present invention, the right and left wheel ratios of following wheels and driving wheels at the time of actual running can be accurately corrected since they are preliminarily stored during initialization. Initialization is performed by actually determining at the time of, for instance, exchanging a tire, how the right and left wheel ratios (relative speed ratios) of right and left tires of different types of driving wheels and slip rates vary due to driving force. Because relationships between the right and left wheel ratios (relative speed ratios) of right and left tires of different types of following wheels and vehicle speeds are preliminarily stored, and since relationships among the right and left wheel ratios (relative speed ratios) of right and left tires of different types of driving wheels, driving force (slip rate) and vehicle speeds are preliminarily stored corrections compensate for differing tire sizes. Consequently, the accuracy for determining a decrease in internal pressure of a tire can be improved, and erroneous alarm or failure in alarm can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for alarming a decrease in internal air-pressure of a tire based on rotational information obtained from tires attached to a four-wheeled vehicle, the apparatus comprising:

a rotational information detecting means for detecting rotational information of each tire;

a storing means for storing the rotational information of each tire and relationships between relative speed ratios of right and left tires of different types of driving wheels which have been preliminarily set to be of normal air-pressure and driving force;

a calculating and processing means for calculating determined values from rotational information of each tire; and a determining means for correcting relative speed ratios of right and left tires of different types of driving wheels at the time of actual running of the vehicle, the correcting being based on the relationship between the relative speed ratio of right and left tires of different types of driving wheels and driving force, and for determining a decrease in internal pressure of a tire; wherein the determining means determines how relative speed ratios of right and left tires vary according to driving force.

2. The apparatus of claim 1, wherein driving force is determined as a function of a slip rate between the driving wheels and the following wheels.

3. The apparatus of claim 1, further comprising:

an initializing device, the initializing device serving to initiate an initialization period during which data is collected establishing the relationships between relative speed ratios of right and left tires of different types of driving wheels which have been preliminarily set to be of normal air-pressure and driving force.

4. The apparatus of claim 3, wherein the calculating and processing means calculates a coefficient using a ratio of the speeds of two vehicle tires, the ratio being calculated by using an average ratio value generated from multiple wheel speed values detected during the initialization period.

5. The apparatus of claim 1, further comprising:

an alarm for alerting a vehicle operator when the internal pressure of a tire has dropped below a predetermined value, wherein the alarm emits a visual or audio signal which is detectable by an operator within the vehicle.

6. An apparatus for alarming a decrease in internal air-pressure of a tire based on rotational information obtained from tires attached to a four-wheeled vehicle, the apparatus comprising:

a rotational information detecting means for detecting rotational information of each tire;

a storing means for storing the rotational information of each tire and relationships between relative speed ratios of right and left tires of different types of driving wheels which have been preliminarily set to be of normal air-pressure and vehicle speed;

a calculating and processing means for calculating determined values from rotational information of each tire; and a determining means for correcting relative speed ratios of right and left tires of different types of following wheels at the time of actual running of the vehicle, the correcting being based on the relationship between the relative speed ratio of right and left tires of different types of following wheels and vehicle speed, and for determining a decrease in internal pressure of a tire; wherein the determining means determines how relative speed ratios of right and left tires vary according to driving force.

7. The apparatus of claim 6, wherein driving force is determined as a function of a slip rate between the driving wheels and the following wheels.

8. The apparatus of claim 6, further including an initializing device, the initializing device serving to initiate an initialization period during which data is collected establishing the relationships between relative speed ratios of right and left tires of different types of driving wheels which have been preliminarily set to be of normal air-pressure and driving force.

9. The apparatus of claim 8, wherein the calculating and processing means calculates a coefficient using a ratio of the speeds of two vehicle tires, the ratio being calculated by using an average ratio value generated from multiple wheel speed values detected during an initialization period.

10. An apparatus for alarming a decrease in internal air-pressure of a tire based on rotational information obtained from tires attached to a four-wheeled vehicle, the apparatus comprising:

a rotational information detecting means for detecting rotational information of each tire;

a storing means for storing the rotational information of each tire and relationships among relative speed ratios of right and left tires of different types of driving wheels which have been preliminarily set to be of normal air-pressure, vehicle speed and driving force;

a calculating and processing means for calculating determined values from rotational information of each tire; and a determining means for correcting relative speed ratios of right and left tires of different types of driving wheels at the time of actual running of the vehicle, the correcting being based on the relationship between the relative speed ratio of right and left tires of different types of driving wheels, vehicle speed and driving force, and for determining a decrease in internal pressure of a tire; wherein the determining means determines how relative speed ratios of right and left tires vary according to driving force.

11. The apparatus of claim 10, wherein driving force is determined as a function of a slip rate between the driving wheels and following wheels.

12. The apparatus of claim 10, further comprising an initializing device, the initializing device serving to initiate an initialization period during which data is collected establishing the relationships between relative speed ratios of right and left tires of different types of driving wheels which have been preliminarily set to be of normal air-pressure and driving force.

13. A method for detecting a decrease in the air pressure of a tire mounted on a vehicle, the method comprising:

initiating an initialization period while the vehicle is in motion;

during the initialization period, determining rotational relationships between vehicle tires;

determining how right and left wheel speed ratios vary according to driving force using the rotational relationships;

storing the rotational relationships between the vehicle tires; and during running of the vehicle, detecting rotational information from the vehicle tires.

14. The method of claim 13, wherein the step of determining rotational relationships between vehicle tires during the initialization period includes the steps of:

determining relative speed ratio values between a right and a left tire at multiple, differing speeds; and generating a linear slip rate function using the ratio values.

15. The method of claim 14, wherein the step of generating a linear slip rate function includes the step of performing a linear regression using the relative speed ratio values.

16. The method of claim 14, further comprising the step of correcting relative speed ratios of a right and a left tire using the slip rate function.

17. The method of claim 16, wherein the step of correcting a relative speed ratio between right and left tires includes the steps of:

correlating the ratio of following wheel speeds using a quadratic function of vehicle speed; and regressing values of the quadratic function.

18. The method of claim 14, further comprising the steps of:

detecting a relative speed ratio between right and left tires; and correcting the relative speed ratio between the right and left tires using the determined relative speed ratio values.

19. The method of claim 13 further comprising the step of determining when a vehicle tire has lost internal air pressure.

* * * * *